US012458888B2

(12) United States Patent
Ikeda

(10) Patent No.: US 12,458,888 B2
(45) Date of Patent: Nov. 4, 2025

(54) GAME SYSTEM, SERVER SYSTEM, METHOD OF PERFORMING A GAME AND METHOD OF PROVIDING INFORMATION ON A GAME

(71) Applicant: BANDAI NAMCO Entertainment Inc., Tokyo (JP)

(72) Inventor: Kohei Ikeda, Kawasaki (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 325 days.

(21) Appl. No.: 18/249,166

(22) PCT Filed: Oct. 12, 2021

(86) PCT No.: PCT/JP2021/037765
§ 371 (c)(1),
(2) Date: Apr. 14, 2023

(87) PCT Pub. No.: WO2022/080379
PCT Pub. Date: Apr. 21, 2022

(65) Prior Publication Data

US 2023/0398448 A1 Dec. 14, 2023

(30) Foreign Application Priority Data

Oct. 15, 2020 (JP) ................................ 2020-173929

(51) Int. Cl.
*A63F 13/5375* (2014.01)
*A63F 13/497* (2014.01)
*A63F 13/833* (2014.01)

(52) U.S. Cl.
CPC ........ *A63F 13/5375* (2014.09); *A63F 13/497* (2014.09); *A63F 13/833* (2014.09)

(58) Field of Classification Search
CPC ... A63F 13/5375; A63F 13/497; A63F 13/833
See application file for complete search history.

(56) References Cited

U.S. PATENT DOCUMENTS 6,319,121 B1 * 11/2001 Yamada ................ A63F 13/497 463/31
6,699,127 B1 * 3/2004 Lobb ....................... A63F 13/45 463/43

(Continued)

FOREIGN PATENT DOCUMENTS

JP 2002-346228 A 12/2002
JP 3570813 B2 9/2004

(Continued)

OTHER PUBLICATIONS

Command & Conquer Remastered Collection Tiberian Dawn, Jun. 7, 2020 Part1, Youtube, https://www.youtube.com/watch?v=msJ27rRJdxA&list=PLG3HP-4qA9S9EGfl6-ynz2LvwvqEoHyXz.

(Continued)

*Primary Examiner* — Reginald A Renwick
(74) *Attorney, Agent, or Firm* — Posz Law Group, PLC

(57) ABSTRACT

The game system is configured: to interrupt the replay process of the replay target game when a given input operation is received from the player during the replay process; to set the switching timing to start the replay target game instruction control process of the game when performing the replay process in response to the player's input operation; to perform the setting determination process to identify the game status of the replay target game at the switching timing and to determine a given setting of the game when starting the replay target game instruction control process from the switching timing based on identified the game status; and to perform the retry game based on the settings determined by the settings determination process and the received player's input operation.

12 Claims, 16 Drawing Sheets

(56) References Cited

U.S. PATENT DOCUMENTS

| | | | | |
|---|---|---|---|---|
| 2010/0248830 | A1 | 9/2010 | Otomo et al. | |
| 2013/0172086 | A1 * | 7/2013 | Ikenaga | A63F 13/48 463/43 |
| 2015/0224409 | A1 | 8/2015 | Hayashida | |
| 2016/0236084 | A1 | 8/2016 | Ikenaga | |
| 2020/0206617 | A1 | 7/2020 | Ikenaga | |
| 2022/0193543 | A1 | 6/2022 | Ikenaga | |
| 2024/0198219 | A1 | 6/2024 | Ikenaga | |

FOREIGN PATENT DOCUMENTS

| | | | |
|---|---|---|---|
| JP | 2005-046280 | A | 2/2005 |
| JP | 2010-233734 | A | 10/2010 |
| JP | 2012-065831 | A | 4/2012 |
| JP | 5441103 | B2 | 3/2014 |
| JP | 2015-153101 | A | 8/2015 |

OTHER PUBLICATIONS

U.S. Appl. No. 18/249,206, filed Apr. 14, 2023, Ikeda.

Konami Official Guide, Konami Official Perfect Guide of “World Soccer Winning Eleven 7 International”, Konami Official Perfect Series, Mar. 18, 2004, pp. 11, 32-39, Konami Corporation, Japan.

International Search Report of the International Searching Authority mailed Jan. 11, 2022 for the corresponding International Application No. PCT/JP2021/037765 (and English translation).

* cited by examiner

| PLAYER | INSTRUCTION ACCEPTANCE TIME(SEC) | | | | | |
|---|---|---|---|---|---|---|
| | 0 | 5 | 6 | 8 | 10 | ... |
| INSTRUCTION OF PLAYER A | BACK | DOWN;RIGHT FOOT | — — | LEFT FOOT | — — | ... |
| INSTRUCTION OF PLAYER B | UP | BACK;BACK;RIGHT HAND;LEFT HAND | UP;LEFT HAND | — — | LEFT HAND; RIGHT HAND; RIGHT FOOT | ... |

FIG. 4A

| PLAYER | | INSTRUCTION ACCEPTANCE TIME(SEC) | | | | | |
|---|---|---|---|---|---|---|---|
| | | 0 | 5 | 6 | 8 | 10 | ... |
| PLAYER A | COORDINATES(X,Y,Z) | | | | | | ... |
| | MOTION | | | | | | ... |
| | STATUS | | | | | | ... |
| PLAYER B | COORDINATES(X,Y,Z) | | | | | | ... |
| | MOTION | | | | | | ... |
| | STATUS | | | | | | ... |

FIG. 4B

| GAME ID:001<br>PLAYER ID(A):101<br>PLAYER ID(B):CPU<br>2020/9/10 | INSTRUCTION ACCEPTANCE TIME(SEC) | | | | | |
|---|---|---|---|---|---|---|
| | 0 | 5 | 6 | 8 | 10 | ... |
| INSTRUCTION OF PLAYER A | BACK | DOWN;RIGHT FOOT | — — | LEFT FOOT | — — | ... |
| INSTRUCTION OF PLAYER B | UP | BACK;BACK;RIGHT HAND;LEFT HAND | UP;LEFT HAND | — — | LEFT HAND; RIGHT HAND; RIGHT FOOT | ... |

FIG. 5A

| GAME ID:001<br>PLAYER ID(A):121<br>PLAYER ID(B):CPU<br>2020/9/14 | | INSTRUCTION ACCEPTANCE TIME(SEC) | | | | | |
|---|---|---|---|---|---|---|---|
| | | 0 | 5 | 6 | 8 | 10 | ... |
| PLAYER A | COORDINATES(X,Y,Z) | | | | | | ... |
| | MOTION | | | | | | ... |
| | STATUS | | | | | | ... |
| PLAYER B | COORDINATES(X,Y,Z) | | | | | | ... |
| | MOTION | | | | | | ... |
| | STATUS | | | | | | ... |

FIG. 5B

GAME SYSTEM, SERVER SYSTEM, METHOD OF PERFORMING A GAME AND METHOD OF PROVIDING INFORMATION ON A GAME

CROSS-REFERENCE TO RELATED APPLICATION

This application is a U.S. national stage application of PCT/JP2021/037765 filed on Oct. 12, 2021, which is based on and claims the benefit of priority of the prior Japanese Patent Application No. 2020-173929 filed on Oct. 15, 2020, the entire contents of which are incorporated herein by reference.

TECHNICAL FIELD

The present invention relates to a game system, a server system, a method of performing a game, and a method of providing information on a game.

BACKGROUND OF THE INVENTION

In recent years, a game system in which a first and a second character each controlled by two players play by fighting in an object space (virtual three-dimensional space) are known.

In particular, in such game system, because the superiority or inferiority of each player's input operation skill greatly affects the game results, and the operating steps for unleashing various techniques is generally complicated, this is one of the reasons why players who do not have confidence in their operational skills avoid playing this type of game.

Recently, in order to help players easily learn the operation steps for making a game character perform various actions, some games are replayed when the player is practicing the operations in the practice mode and the predetermined conditions are met (for example, Japanese Patent No. 3570813).

SUMMARY OF INVENTION

Problem to be Solved by the Invention

However, it is difficult to reproduce the game status that the player wants to practice the game depending on the player's settings and the like, and to provide a system to perform the practice for difficult tasks in the game system, Japanese Patent No. 3570813, that performs replays of multiplayer battle game. This is because various game elements are involved in a complex manner, although it is possible to find out tasks in the player's input operation based on the replaying the game.

The present invention is to provide a game system and the like, that enables users to easily replay and practice past games without complicated settings and operations when the player wants to play a past game or to practice at a predetermined game scene.

Solution to Problem (1) In a game system according to a first aspect of the invention, there is provided the game system that performs a game using a player character that is controlled by player' instruction, having:

a reception process unit that accepts a player's input operation;

a game control unit to perform a game control process that controls progress of the game by controlling the player character in accordance with an accepted input operation;

a storing control unit to store to a memory unit, as game data for replay, data of the game when performing the game control process;

a replay process unit to perform a replay process to read out stored game data for replay from the memory unit, and to replay game play from a give timing according to read-out game data;

an interrupting control unit to interrupt the replay process of a replay target game when accepting a given input operation from the player during the replay of the replay target game subject to the replay process, and to set a switching timing for starting the game control process of the replay target game in response to the player's input operation as a replay target game instruction control process;

a determination process unit to perform a determination process to identify a game status of the replay target game at the switching timing, and to determine a given setting of the game when starting the replay target game instruction control process from the switching timing based on the identified game status; and the game control unit to perform the replay target game instruction control process from the switching timing as a retry game based on settings determined by the determination process and the player's input operation accepted after the switching timing.

(2) In a method for playing a game according to a second aspect of the invention, there is provided the method of playing the game using a player character that is controlled by player' instruction, having:

accepting a player's input operation;

performing a game control process that controls progress of the game by controlling the player character in accordance with an accepted input operation;

storing to a memory unit, as game data for replay, data of the game when performing the game control process;

performing a replay process to read out stored game data for replay from the memory unit, and to replay game play from a give timing according to read-out game data;

interrupting the replay process of a replay target game when accepting a given input operation from the player during the replay of the replay target game subject to the replay process, and setting a switching timing for starting the game control process of the replay target game in response to the player's input operation as a replay target game instruction control process;

performing a determination process to identify a game status of the replay target game at the switching timing, and to determine a given setting of the game when starting the replay target game instruction control process from the switching timing based on the identified game status; and performing the replay target game instruction control process from the switching timing as a retry game based on settings determined by the determination process and the player's input operation accepted after the switching timing.

(3) In a server system according to a third aspect of the invention, there is provided the server system that provides information of a game using a player character that is controlled by player' instruction to a terminal device, having:

a reception process unit that accepts a player's input operation;

a game control unit to perform a game control process that controls progress of the game by controlling the player character in accordance with an accepted input operation;

a storing control unit to store to a memory unit, as game data for replay, data of the game when performing the game control process;

a replay process unit to perform a replay process to read out stored game data for replay from the memory unit, and to replay game play from a give timing according to read-out game data;

an interrupting control unit to interrupt the replay process of a replay target game when accepting a given input operation from the player during the replay of the replay target game subject to the replay process, and to set a switching timing for starting the game control process of the replay target game in response to the player's input operation as a replay target game instruction control process;

a determination process unit to perform a determination process to identify a game status of the replay target game at the switching timing, and to determine a given setting of the game when starting the replay target game instruction control process from the switching timing based on the identified game status;

a providing unit to provide information of game progress that includes replayed information to the terminal device; and the game control unit to perform the replay target game instruction control process from the switching timing as a retry game based on settings determined by the determination process and the player's input operation accepted after the switching timing.

(4) In a method for providing information regarding a game according to a fourth aspect of the invention, there is provided the method of providing, to a terminal device, information of a game using a player character that is controlled by player' instruction, having:

accepting a player's input operation;

performing a game control process that controls progress of the game by controlling the player character in accordance with an accepted input operation; storing to a memory unit, as game data for replay, data of the game when performing the game control process;

performing a replay process to read out stored game data for replay from the memory unit, and to replay game play from a give timing according to read-out game data;

interrupting the replay process of a replay target game when accepting a given input operation from the player during the replay of the replay target game subject to the replay process, and setting a switching timing for starting the game control process of the replay target game in response to the player's input operation as a replay target game instruction control process;

performing a determination process to identify a game status of the replay target game at the switching timing, and to determine a given setting of the game when starting the replay target game instruction control process from the switching timing based on the identified game status;

providing information of game progress that includes replayed information to the terminal device; and performing the replay target game instruction control process from the switching timing as a retry game based on settings determined by the determination process and the player's input operation accepted after the switching timing.

BRIEF DESCRIPTION OF DRAWINGS

FIG. 4A is a diagram illustrating an example of game date (replay data) in one embodiment of the present invention.

FIG. 4B is a diagram illustrating an example of game date (replay data) in one embodiment of the present invention.

FIG. 5A is a diagram illustrating an example of game date (replay data) in one embodiment of the present invention.

FIG. 5B is a diagram illustrating an example of game date (replay data) in one embodiment of the present invention.

Figure 1:
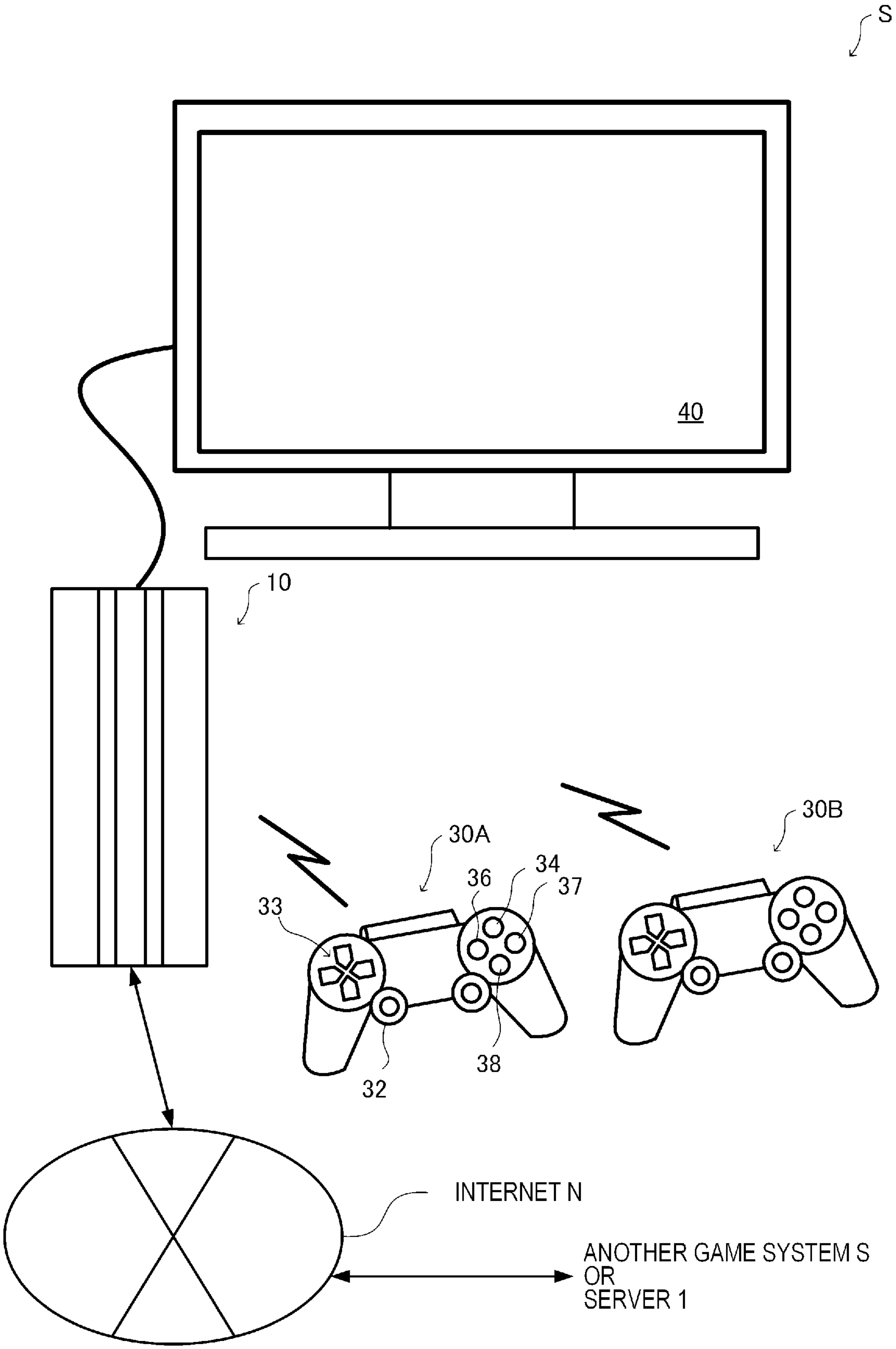
FIG. 1 is an example of a system configuration diagram illustrating a game system configuration according to one embodiment of the present invention.

DESCRIPTION OF THE EMBODIMENTS (1) According to an embodiment of the invention, there is provided a game system that plays a game using a player character that is controlled by player' instruction, having:

a reception process unit that accepts a player's input operation;

a game control unit to perform a game control process that controls progress of the game by controlling the player character in accordance with an accepted input operation;

a storing control unit to store to a memory unit, as game data for replay, data of the game when performing the game control process;

a replay process unit to perform a replay process to read out stored game data for replay from the memory unit, and to replay game play from a give timing according to read-out game data;

an interrupting control unit to interrupt the replay process of a replay target game when accepting a given input operation from the player during the replay of the replay target game subject to the replay process, and to set a switching timing for starting the game control process of the replay target game in response to the player's input operation as a replay target game instruction control process;

a determination process unit to perform a determination process to identify a game status of the replay target game at the switching timing, and to determine a given setting of the game when starting the replay target game instruction control process from the switching timing based on the identified game status; and the game control unit to perform the replay target game instruction control process from the switching timing as a retry game based on settings determined by the determination process and the player's input operation accepted after the switching timing.

Based on this configuration, the one embodiment of the present invention can accept new instruction of a player form a predetermined timing after reflecting setting based on game status in a replay target game during reproduction of play contents of a game (that is replay target game) performed based on the player's input operation in the past, the predetermined timing being timing (hereinafter also referred to as the "desired timing") when the player wishes to perform re-operation.

For example, an embodiment of the present invention can perform the game using the instruction of the player based on the assumption of player's input operation history, result details of the various objects of a player character and the like, positions or positional relationships of various objects, and the assumption of game statuses of various parameters and the like in a past game, from not only the player's desired timing, but also from a separation timing before the player's desired timing. For example, the separation timing is a timing before the start of an attack or before the start of a scene or section thereof when the desired timing is during an attack.

Therefore, one embodiment of the present invention can easily replay of a past game from the timing desired by the player, or easily practice (including repeatedly practice) in a specific game scene, without complicated settings or instructions by the player.

The recitation, "game using a player character that is controlled by player' instruction" includes, for example, a multiplayer game, a sound game, a puzzle game, and a racing game using a player character or avatar.

The "game control process" includes not only control processing in which a game is progressed based on operation control of a player character, but also control processing in which another player characters are also controlled by instructions of another player, such as the multiplayer game, and control processing in which another player character is controlled based on an automatic operations of NPC.

For example, the "game data" includes:

(A1) data of an instruction of a player (instructions of each players when performing game by a plurality of players such as a multiplayer game);

(A2) control data defining a position (that is, a coordinate in the game space, same as below), motion (specifically, each of positions of parts of the player character, that is, a coordinate in the game space, same as below) and status of a player character (or a plurality of player characters when the plurality of player characters is joined);

(A3) control data defining a position, motion and status of each of characters (including an enemy player character, for example) in game; and (A4) control data defining a position, motion and status of each of objects which the game space has. Incidentally, the "replay process" may be performed by the game control processing is performed based on the instruction data of the player as game data when using the instruction data of the player. Further, the "replay process" may be performed by controlling each of the character or each of the objects along with these control data or by combining the game control processing and the controlling each of the character or each of the objects.

The "game data" may indicate a data group of time-series data from the start of the game to the end of the game, or also indicate a data group of time-series data of any one interval during the game.

Further, the "game data" may be game data of a retry game performed by a replay target game instruction control process, or game data of a game played by another player.

For example, the "given timing" includes a timing when a game starts, a timing during game such as a timing when a level or a stage of the game changes, and a timing indicated by the player.

The "replay process" simply indicates a process of reproducing past game contents by replaying game data of a past game like a video, and a process only for viewing by a player without player's instruction in real time.

The recitation, "the determination process to determine given settings in a game when starting replay target game instruction control process from a switching timing based on identified game status" indicates to determine various settings to start (switch) the replay target game as a retry game in the state that is inherited the game status of the replay target game during replaying.

Specifically, the "settings" may be settings to faithfully reproduce the identified game status, or may be the settings not to faithfully reproduce the identified game status such as the settings excluding the predetermined settings that includes a hit point and time limit and the setting having a part of the predetermined settings, or may be the settings having additional settings that includes a player's level and a number of items.

For example, the "game status" includes:

(B1) a parameter (for example, color information, a coordinate of the target to be reached in the case of a moving object, and final form in the case of an object undergoing change) that is set for each of characters including a player character such as a position (a coordinate in the game space), motion (specifically, each of current coordinates of parts of the character and a coordinate of final position of them after moving), a hit point (for example, a current point and a maximum point), an experience point and an ability score (including unlocked score after satisfying the predetermined condition) of each of characters in game, same as below);

(B2) a parameter related to an item including a type of an item, a number of items, and ability score of the item obtained by each of the characters and the player such as color information, a coordinate of the target to be reached in the case of a moving object, and final form in the case of an object undergoing change;

(B3) a parameter such as acquired in-game currency, scores, points, and results; and (B4) a parameter related to an object in the game space, such as a type, a position, and characteristics of each of an object.

The "settings" include a part of and all of the above elements which the game status having. The identified "game status" and the determined "settings" may be provided to the player by displaying.

For example, the "replay target game instruction control process" indicates control of the game in general, such as control of not only the player character to be operated by the player, but also control of the motion of another character and control of each of the object in the game space.

When performing the replay target game instruction control processing, the speed of progress of the game (even for some terms of time) may be changed. the speed of progress of the game may be varied. That is, in a retry game, the speed of progress may be slower (e.g., 0.5 times slower) when the replay process or game control process is performed.

(2) According to an embodiment of the invention, there may be provided the game system having the game control unit that performs the game control process different from the game control process before the switching timing of the replay target game, as the retry game, when performing the replay target game instruction control process from the switching timing.

Based on this configuration, the one embodiment of the present invention can change control content of game control before the switching timing to control content of the game control after the switching timing, such as:

(C1) change a type, an ability, an item and the like of a character and an object that appear in the game;

(C2) change operation timing and motion such as an appearance timing, an appearance method, an attack timing, an attack method of various characters including enemy characters;

(C3) change a control timing of an object; and (C4) change game environment including background music and an insert image.

Therefore, one embodiment of the present invention can practice (repeatedly practice) the play of the past game in the environment requested by a player when replaying the past game from the timing desired by the player.

For example, "the game control process different from the game control process before the switching timing of the replay target game" indicates a process that changes the control content of the game control process before the switching timing based on the player's input operation or an attribute such as a player's level.

(3) According to an embodiment of the invention, there may be provided the game system having the game control unit that performs the replay target game instruction control process to control the motion of an opponent character to be the opponent of the player character, as the retry game, based on the game status of the retry target game at the switching, when performing game control process and the replay target game instruction control process of a multiplayer game in which the player character battles another character.

Based on this configuration, the one embodiment of the present invention can change the operation timing and the motion before the switching timing to the operation timing and the motion after the switching timing, such as the appearance timing, the appearance method, the attack timing, the attack method.

Therefore, one embodiment of the present invention can control of practicing (repeatedly practicing) the play of the past game or replaying the past game from the timing desired by the player.

(4) According to an embodiment of the invention, there may be provided the game system having the interrupting process that sets, as the switching timing, a timing before an interruption timing when interrupting the replay process.

Based on this configuration, the one embodiment of the present invention can set the switching timing as an interruption timing, to a timing before attacking when the timing during attack is instructed by the player's instruction, or to a timing before entering or performing the command or a specified timing during performing a command when the timing during performing the command is instructed by the player.

Therefore, the one embodiment of the present invention can improve the convenience of the player's input operation, because it is not necessary to strictly indicate the interruption timing and a suitable timing can be set for the player to redo the game play of the player.

The "switching timing" is preferable to be set according to the status of the interruption timing, and may be an interruption timing.

For example, the "switching timing" may be a timing specified by the player in advance, a timing before a uniformly determined time, or a timing predetermined in the game. In addition, a timing earlier than the shown below timing (a timing before an event) may be set as the switching timing, when the switching timing is a timing at which the motion of the player character cannot be changed after the interruption timing, a timing at which another event has already occurred, or a timing at which an event caused by the motion of the player character at the interruption timing occurs.

The "switching timing" may be selected from among a plurality of timings, and be selected from among a plurality of timings (specified timing before entering the command, before performing the command and during performing the command) detected in the replay target game based on the player's instruction. In this case, options may be simply offered to the player, and offered to the player by displaying each of options as an image (for example, thumbnail display, or time-series and frame-by-frame display).

(5) According to an embodiment of the invention, there may be provided the game system having the interrupting control unit that sets the switching timing and a specific timing indicating a timing after accepting switching timing when accepting a given input operation from the player, and the game control unit that performs the replay target game instruction control process by repeating a term from the switching timing to the specific timing as the retry game.

Based on this configuration, because the predetermined section or the predetermined term of the replay target game, such as the race game or the shooting game can be performed repeatedly, the one embodiment of the present invention can intensively practice the section or term in which the player is weak.

For example, the "specified timing" indicates a timing specified by instruction of the player, a timing after a predetermined term of time, such as 30 seconds after the switching timing, or a timing determined by a time division such as a time limit or the time division set in the game.

For example, the division set in the game is a division up to the first stage that ends after the switching timing when the game has multiple stages, and a division up to a predetermined point on the path taken by the player character in the game (that is, a specific section).

The recitation, "performing . . . by repeating a term" may be indicate to perform the replay target game instruction control process by moving the switching timing automatically when the specified timing has come, by moving the switching timing when the specified timing has come, and by moving the switching timing after entering the instruction of the player or after a predetermined term such as 10 second.

(6) According to an embodiment of the invention, there may be provided the game system having a result specifying unit to specify the results of each game performed by the game control process and the results of the retry game performed by the replay target game instruction control process; a comparing unit to perform a comparing process to compare the results of an original game, which is the replay target game replayed by the game data for which the replay target game instruction control process has not been performed, with the results of the retry game in the same replay target game as the original game; and a providing unit to provide a comparison result of the comparing process to the player.

Based on this configuration, because presenting operation skills of the retry game (for example, the operation skills associated with improvement of the player's result) by visualizing based on comparing the retry game and the original game, the one embodiment of the present invention can improvement the interest in the game by recognizing the player's degree of improvement and progress.

For example, "comparing process" includes a process of comparing:

(D1) each of results of the whole game from a game start to a game over of the retry game and original game;

(D2) results for a term of the retry game and original game from the switching timing to the predetermined timing such as game over and an end of a stage; and (D3) results for a same section from a point or an area of the switching timing to a predetermined point or a predetermined area in the game space. Basically, the terms of D2 are preferable that term is the same length. However, the terms of D2 do not have to be the same length when the end timing, such as the end timing of the stage or the section, or the timing of clearing the predetermined task, are the same, even when the retry game progresses smoothly and the game end timing is longer than the original game.

The "result" includes final results (that is, game results) and results at predetermined timing (results in predetermined sections such as lap times and intermediate results). For example, the result includes: match results (win rate, a number of wins, negative numbers, a number of kills in battle games); hit points (a number of times attacked and points given to enemy characters by attack); a number of defeated enemy characters (a number of enemy characters shot down)); score; time (time to clear a mission or task or time from start to goal or predetermined point); and earned rewards (items, points or in-game currency), (7) According to an embodiment of the invention, there may be provided a game system having the interrupting control unit that performs the game control process to appear, in the retry game during the performing of the replay target game instruction control process, at least the player character of the original game, which is the same replay target game as the retry game.

Based on this configuration, because it is possible to visually recognize the difference from the original game while executing the retry game, the one embodiment of the present invention can usefully practice the retry game.

(8) According to an embodiment of the invention, there may be provided a game system having a game element visualization unit to visualize a change of a given game element from the start of the replay target game to the end of the replay target game, and to prove the change to the player, and the determination unit that performs the determination process to identify the status of the replay target game at an instructed switching timing when instructing the switching timing based on the game element provided by the player, and to determine the given setting on the game when starting the replay target game instruction control process.

Based on this configuration, the one embodiment of the present invention can visualize temporal or distance changes in game elements from the start to the end of the game, the ratio of the game elements, and the like along the time axis or along the distance axis in game space, based on parameters indicating game elements such as the amount of damage given to an enemy character and the amount of damage received from the enemy character.

Therefore, the one embodiment of the present invention can make the player consider factors (scenes directly related to the loss) that caused the player character to lose due to changes in game elements, and can make the player intensively practice the retry game regarding the reason for the defeat when the beginning of the scene of the cause of the defeat is set as the switching timing.

For example, the "game element" includes:

(E1) damage dealt by the player character to the enemy character and damage received by the player character;

(E2) elements directly related to game over and progress of the game, such as the hit point, life energy value, and points of the player character;

(E3) attack elements such as a number of techniques used when attacking, a number of attacks, and a number of hits in attacks;

(E4) defense elements such as a number of defenses and a number of attacks received during defense;

(E5) a number of owned items and a number of uses of the items;

(E6) elements related to movement such as a number of accelerations, a number of decelerations, average speed, and speed change (E7) elements related to combos and mistakes, such as a number of continuous attacks, and a number of consecutive task clears and mistakes in games, for example, sound games, that clear consecutive tasks.

For example, the recitation, "visualize the changes of a given game element along the time axis" indicates graphing, such as a pie chart, a bar chart, a line chart, a band chart, a radar chart, or a scatter chart. For graphs such as pie charts that do not have a time axis, graphs are generated for each predetermined term, and changes in the graph for each predetermined term allow the player to visualize changes in game elements from the start to the end of the game.

(9) According to an embodiment of the invention, there may be provided a game system having the determination process unit that performs a setting change process to determine the setting subject to the determination process at switching timing based on the player's input operation, and to change the setting that has determined already during the replay target game instruction control process.

Based on this configuration, the one embodiment of the present invention can progress the game with settings different from the original game from the switching timing, or progress with settings different from the original game during execution of the retry game.

Accordingly the one embodiment of the present invention can perform the original game from a new perspective, and maintain or improve the interest of the game.

For example, the settings of a settings change process indicates:

(F1) the position in the game space of each character including the player character and the enemy characters;

(F2) a type of each of the characters;

(F3) a type of and a number of the items in the player character;

(F4) change to the game stages and quests; and (F5) occurrence or cancellation of events in the game space, such as the presence or absence of explosions and changes in the game stage (for example, the floor breaks during battle).

(10) According to an embodiment of the invention, there is provided a method of performing a game using a player character that is controlled by player' instruction, having:

accepting a player's input operation;

performing a game control process that controls progress of the game by controlling the player character in accordance with an accepted input operation;

storing to a memory unit, as game data for replay, data of the game when performing the game control process;

performing a replay process to read out stored game data for replay from the memory unit, and to replay game play from a give timing according to read-out game data;

interrupting the replay process of a replay target game when accepting a given input operation from the player during the replay of the replay target game subject to the replay process, and setting a switching timing for starting the game control process of the replay target game in response to the player's input operation as a replay target game instruction control process;

performing a determination process to identify a game status of the replay target game at the switching timing, and to determine a given setting of the game when starting the replay target game instruction control process from the switching timing based on the identified game status; and performing the replay target game instruction control process from the switching timing as a retry game based on settings determined by the determination process and the player's input operation accepted after the switching timing.

Based on this configuration, the one embodiment of the present invention can accept new instruction of a player form a predetermined timing after reflecting setting based on game status in a replay target game during reproduction (replay) of play contents of a game played based on the player's input operation in the past, the predetermined timing being the desired timing when the player wishes to perform re-operation.

Therefore, one embodiment of the present invention can easily replay of a past game from the timing desired by the player, or easily practice (including repeatedly practice) in a specific game scene, without complicated settings or instructions by the player.

(11) According to an embodiment of the invention, there is provided a server system that provides information of a game using a player character that is controlled by player' instruction to a terminal device, having:

a reception process unit that accepts a player's input operation;

a game control unit to perform a game control process that controls progress of the game by controlling the player character in accordance with an accepted input operation;

a storing control unit to store to a memory unit, as game data for replay, data of the game when performing the game control process;

a replay process unit to perform a replay process to read out stored game data for replay from the memory unit, and to replay game play from a give timing according to read-out game data;

an interrupting control unit to interrupt the replay process of a replay target game when accepting a given input operation from the player during the replay of the replay target game subject to the replay process, and to set a switching timing for starting the game control process of the replay target game in response to the player's input operation as a replay target game instruction control process;

a determination process unit to perform a determination process to identify a game status of the replay target game at the switching timing, and to determine a given setting of the game when starting the replay target game instruction control process from the switching timing based on the identified game status;

a providing unit to provide information of game progress that includes replayed information to the terminal device; and the game control unit to perform the replay target game instruction control process from the switching timing as a retry game based on settings determined by the determination process and the player's input operation accepted after the switching timing.

Based on this configuration, the one embodiment of the present invention can accept new instruction of a player form a predetermined timing after reflecting setting based on game status in a replay target game during reproduction (replay) of play contents of a game played based on the player's input operation in the past, the predetermined timing being the desired timing when the player wishes to perform re-operation.

Therefore, one embodiment of the present invention can easily replay of a past game from the timing desired by the player, or easily practice (including repeatedly practice) in a specific game scene, without complicated settings or instructions by the player.

(12) According to an embodiment of the invention, there is provided a method of providing, to a terminal device, information of a game using a player character that is controlled by player' instruction, comprising:

accepting a player's input operation;

performing a game control process that controls progress of the game by controlling the player character in accordance with an accepted input operation;

storing to a memory unit, as game data for replay, data of the game when performing the game control process;

performing a replay process to read out stored game data for replay from the memory unit, and to replay game play from a give timing according to read-out game data;

interrupting the replay process of a replay target game when accepting a given input operation from the player during the replay of the replay target game subject to the replay process, and setting a switching timing for starting the game control process of the replay target game in response to the player's input operation as a replay target game instruction control process;

performing a determination process to identify a game status of the replay target game at the switching timing, and to determine a given setting of the game when starting the replay target game instruction control process from the switching timing based on the identified game status;

providing information of game progress that includes replayed information to the terminal device; and performing the replay target game instruction control process from the switching timing as a retry game based on settings determined by the determination process and the player's input operation accepted after the switching timing.

Based on this configuration, the one embodiment of the present invention can accept new instruction of a player form a predetermined timing after reflecting setting based on game status in a replay target game during reproduction (replay) of play contents of a game played based on the player's input operation in the past, the predetermined timing being the desired timing when the player wishes to perform re-operation.

Therefore, one embodiment of the present invention can easily replay of a past game from the timing desired by the player, or easily practice (including repeatedly practice) in a specific game scene, without complicated settings or instructions by the player.

Hereinafter, preferred embodiments of the present invention will be described. Note that the following embodiments do not unduly limit the scope of the invention as stated in the claims. In addition, all of the elements described in connection with the following embodiments should not necessarily be taken as essential requirements of the invention.

[1] Outline of the Game System

First, the outline and configuration of the game system S in the present embodiment will be described with reference FIG. 1. FIG. 1 is an example of a system configuration diagram illustrating configuration of the game system S according to the present embodiment.

The game system S according to the present embodiment is a game system that performs a battle game in which a first character controlled by a first player's input operation and a second character controlled by a second player's input operation compete against each other in a given game space (an object space).

Specifically, the game system S according to the present embodiment has: one or more controllers 30 operated by a player; a game main unit 10 that performs game process; and a display 40 that displays game images.

The game system S is configured to perform a battle game based on a game program or game data read from a memory, which is an information storage medium, or an operation signal input from the controller 30, in order to allow the players to enjoy playing the battle game while viewing a game screen displayed on the display 40.

For example, the game system S is configured to accept input operations based on the joystick 32, the cross key 33, and various buttons on the controller 30 operated by the player. The game system S is configured to control a player character based on the various game operations such as inputting types of techniques and timing for performing techniques. The game system S is configured to play against another player (a player who performs instruction to another controller 30B connected to the game system S or a player who operates another game system S connected via a network N), or against a character (NPC) controlled by the CPU.

In the present embodiment, information is transmitted and received between the controller 30 and the game main unit 10 through wireless communication. Instead, the controller 30 and the game main unit 10 may be connected by a communication cable, and information may be transmitted and received through the communication cable.

The main unit 10 performs the game process based on the instruction of the player (or a plurality of players when a plurality of controllers 30 are connected) via the controller 30, and based on process results, displays various game images on the display 40, and outputs various sound, such as BGM, form a speaker (not shown) during the game.

The controller 30 has: a joystick 32; cross keys 33; and a plurality of buttons 34, 36, 37 and 38 formed on the entire front surface.

For example, the right hand button 34 is an input unit for "right punch," the left hand button 36 is an input unit for "left punch," the right foot button 37 is an input unit for "right kick," and the left foot button 38 is an input unit for "left kick".

The controller 30 is also configured to recognize as a special input operation when inputting the player's input operation by multiple buttons simultaneously, or when inputting the player's input operation by a combination of the direction in which the cross key 33 is pressed down (including diagonal direction and neutral) and the buttons.

In addition to the above, the controller 30 has a plurality of buttons (not shown) on the sides and other parts.

Further, the controller 30 may also has a steering wheel, a microphone, a touch panel display, and an acceleration sensor.

[2] Game Main Unit

Figure 2:
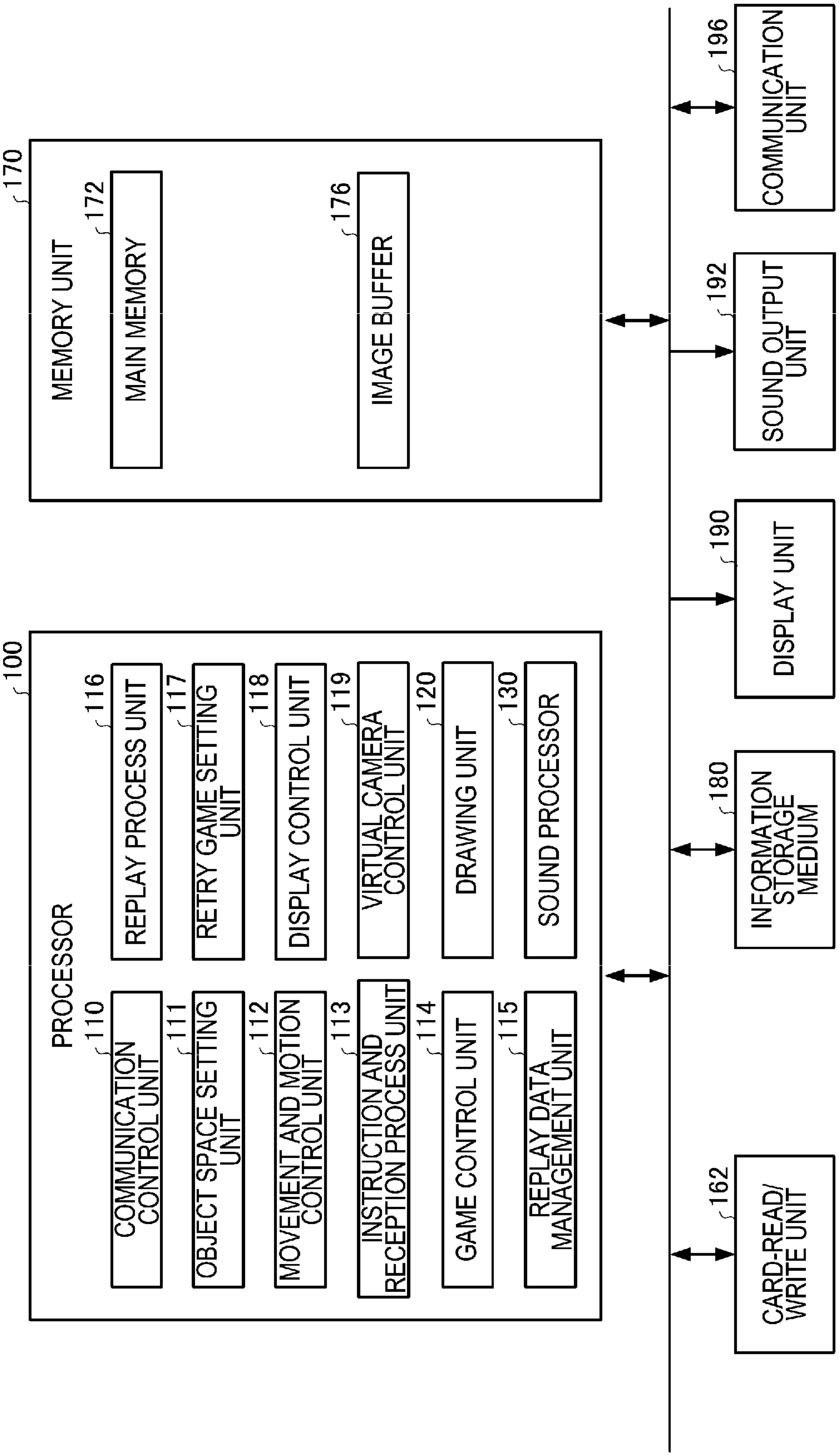
FIG. 2 is an example of a functional block diagram illustrating a game main unit according to one embodiment of the present invention.

Next, the configuration of the game main unit 10 of the present embodiment will be described with reference to FIG. 2. FIG. 2 is an example of a functional block diagram of the game main unit 10 according to the present embodiment. The game main unit 10 of the present embodiment may be configured by omitting one or more components shown in FIG. 2.

The card-read/write unit 162 reads data from the game card and writes the data to the game card, based on control of the processing section 100.

The memory unit 170 stores predefined programs and data and serves as a work area for the processor 100 and the communication unit 196 and the like. The memory unit 170 temporarily stores the calculation results performed by the processing section 100 in accordance with various programs and input data input from the controller 160. The function of the memory unit 170 can served by RAM (VRAM) and the like.

The memory unit 170 has a main memory 172 and an image buffer 176, and stores: a system program for realizing various functions to have the processing section 100 control the game system S in an integrated manner; a game program; various data; and the like, necessary to execute the multi-player battle game, Specifically, in the memory unit 170, character setting data, stage setting data, and various data for setting of virtual camera (hereinafter referred to as the "virtual camera setting data") are stored For example, the necessary data for performing the processes of related to the progress of the game has the data, such as angle of view, viewing direction, and posture information for controlling the virtual camera, and count data for various time limits.

The character setting data has the base information that is necessary data to display and motion control of the characters, such as model data, texture data, and motion data of the characters used in the multiplayer game, in association with each character.

The stage setting data has information including model data, texture data and the like to form the stage, which is the stage to play the battle game in the three-dimensional virtual space, in association with each stage.

The virtual camera setting data has the standard setting of the virtual camera to image the game space. For example, the virtual camera setting data has the position of the virtual camera, angle of view, movement path, movement speed, rotation direction and speed, change of zoom and so on.

In the memory unit 170, in order to allow the player to view the contents of a past game as a replay, the instruction data, the various data or the both of the instruction data and the various data are stored, as game data for replaying in association with each game. The instruction data is a data of the player when the multiplayer battle game is performed by the player. The various data is a data performed by a process (hereinafter referred to as "game control process") to control the progress of the multiplayer battle game in response to the player's operation instruction.

In this embodiment, the game data for replay is used not only for replay, but also for identifying the game status of the game in replay (hereinafter referred to as "replay target game"), for interrupting the process for replay (hereinafter referred to as "replay process"), and for performing the replay target game (hereinafter referred to as a "retry game") based on the instruction of the player from a predetermined timing.

In the information storage medium 180 (a computer-readable medium), programs, data, and the like, are stored. The functions of the information storage medium 180 are implemented by hardware such as an optical disk (CD or DVD), magnetic disk (MO), magnetic disc, hard disc, magnetic tape, or memory (ROM).

In the information storage medium 180, a program for causing a computer to function as each unit of the present embodiment (a program for causing the computer to execute the process of each unit) can be stored.

In the information storage medium 180, the system program for realizing various functions to have the processor 100 control the game system S in an integrated manner, the game program necessary to perform the multiplayer battle game, various data and the like, may be stored similar to the memory unit 170, instead of the memory unit 170, or together with the memory unit 170.

A display unit 190 displays a given image. The function of the display unit 190 can be implemented by a CRT, an LCD, a touch panel type display, or an HMD (head mounted display) and so on.

A sound output unit 192 outputs a sound that is generated by the present embodiment. The function of the sound output unit 192 can be implemented by a speaker, a headphone and the like.

A communication unit 196 performs the various control to communicate with an external device (for example, a terminal, such as other game system S or a communication terminal including a smartphone, a server 1 and so on) via a network N. The functions of the communication unit 196 can be implemented by hardware of various processors or ASICs for communication, program and so on.

The programs and the data for making the computer function as the units of the present embodiment that are stored in the information storage medium 180 or memory unit 170 of the server device 1 may be received via the network, and be stored in the information storage medium 180 or memory unit 170. The case in which the terminal is made to function by receiving the program or data in this manner is also included within the scope of the present invention.

The communication unit 196 executes various controls for communication (for example, Near Field Communication) with one or more controllers 30.

The communication unit 196 includes an antenna and a wireless module, and transmits and receives the data with the one or more controllers 30 using, for example, Bluetooth (Registered Trademark) technology.

For example, the communication unit 196 transmits sound data, such as confirmation and sound effect sounds, and vibration signals to the controller 30, and receives information (acceleration vector values, etc.) detected by acceleration sensors and input operations at the controller 30 at alternating intervals of 4 msec and 6 msec.

The processor 100 performs processing game process, image generation process, sound generation process, and so on, based on input data and programs from the controller 30 or the card-read/write unit 162.

In particular, the processor 100 performs various processes using the main memory 172 in the memory unit 170 as a work area Further, the processor100 is implemented by hardware such as various processors (CPU, DSP, etc.), ASICs (gate arrays, etc.), and programs, and performs various functions.

The processor 100 is configured to perform the various processes of the present embodiment or the various functions for the battle games based on programs (data) stored in the memory unit 170 or information storage medium 180.

Specifically, the processor 100 includes a communication control unit 110, an object space setting unit 111, a movement and motion control unit 112, an instruction and reception process unit 113, a game control unit 114, a replay data management unit 115, a replay process unit 116, a retry game setting unit 117, a display control unit 118, a virtual camera control unit 119, drawing unit 120, and sound process unit 130. One or more of these units may be omitted from the configuration.

The communication control unit 110 processes data transmission and reception via a network with the server device 1 and terminal devices such as other game systems.

Specifically, the communication control unit 110 performs processes for receiving various information transmitted from the server device 1 and other terminal devices and for transmitting the information to the server device 1 and other terminal devices when playing the multiplayer game based on information received from the server device 1 or when playing against other players via a network.

In the game system S of the present embodiment, the communication control unit 110 acquires the network information required for communication control from the server 1 and manages the communication control.

For example, the game system S may acquire identification information for terminal devices (data or ID that is individually assigned to identify terminals in order to participate in online games) that is individually assigned to each game system S, and destination information that specifies the destination of packet transmission (such as IP address) that is associated with the identification information of each game system S. Further, the game system S may manage the identification information for terminal devices and the destination information.

Specifically, the communication control unit 110 performs: a process that generates the packets to be sent to other terminal devices or server devices 1; a process that specifies the IP address and the port number of the packet transmission destination terminal device or server device 1; a process that stores data contained in received packets in the memory unit 170, a process that analyzes received the packets; and other control processes related to the transmission and reception of packets.

The communication control unit 110 transmits and receives the data to and from a plurality of other game systems S or the server device 1 in a predetermined cycle (for example, one second cycle) from the time a communication connection that is established until the communication connection is terminated.

In the case of a network system including the terminal devices of the plurality of game systems S, the communication control unit 110 may execute communication control using the peer-to-peer (so-called P2P) method, in which online games are executed while transmitting and receiving data between a plurality of terminal devices. In the case of a network system including a plurality of terminal devices, communication control unit 110 may execute communication control using the client-server method, in which each terminal device executes an online game while sending and receiving data (information) via the server device 1.

In the network system of the present embodiment, the data may be transmitted and received not only by wired communication but also by wireless communication.

The communication control unit 110 performs the process of acquiring input information from the controller 30. For example, the communication control unit 110 receives the various instructions of each of players for the game, such as instructions for controlling the player characters and the replay instructions.

The object space setting unit 111 performs process of arranging an object in an object space (virtual three-dimensional space). For example, the object space setting unit 111 performs process of make a game space (for example, a stage for the charters to battle) in the virtual three-dimensional space. The object space setting unit 111 performs process of arranging a display object such as a building, a baseball park, a car, a tree, a pillar, a wall, and a map (landform) in the object space. Here, the object space is a virtual game space. For example, in the case of a virtual three-dimensional space, the object is arranged in a three-dimensional coordinate system (X, Y, Z), such as a world coordinate system or a virtual camera coordinate system.

For example, the object space setting unit 111 arranges the object (an object that is composed of primitives such as a polygon, a free-form surface, or a sub-division surface) in the world coordinate system. For example, the object space setting unit 111 determines a position and a rotation angle (synonym of orientation and direction) of the object in the world coordinate system and arranges the object at the rotation angle (rotation angle around the X, Y, and Z axes) in the position (X, Y, and Z).

The object space setting unit 111 may perform a process of arranging an instruction object, such as an input instruction object and a marker of the special command on a screen (two-dimensional image, screen, screen coordinate system). The object space setting unit 111 may arrange the instruction object in the object space (the three-dimensional space, the world coordinate system, the virtual camera coordinate system, and the model coordinate system).

The movement and motion processor 112 performs calculation of movement and operation of the object in the object space. Namely, the movement and motion processor 112 performs the process of moving the object in the object space, and the process of operating the object (motion or animation), based on the input information, the program (movement and motion algorithm), or the various data (motion data) from the controller 160.

The movement and motion processor 112 controls the behavior of character objects (characters), which are major objects, in the object space.

Specifically, the movement/motion processor 112 performs: a process of controlling the movements of the characters of the player and the opponent based on operation codes of input operation from controller 160 and obtained from the opponent's game system S, and selection instruction data; a process of displaying effects when certain conditions are met; a process of hit judgments for attack techniques; the process of damage based on the process of the hit judgments; and so on.

The movement and motion processor 112 performs these processes every frame (for example, 1/60 second). The frame is the unit of time in which the object movement and action process and image generation process are performed.

The instruction and reception process unit 113 performs recognition process of instruction commands based on input information input to the controller 160 by the player.

Specifically, the instruction and reception process unit 113 in the present embodiment recognizes instruction commands input by the player, based on the type of button, a number of button presses, the direction of a lever indication, the timing of button pressing down and a lever indication timing, and combinations of these input by the input unit 260.

For example, the instruction and reception process unit 113 accepts the instruction as "right punch" when detecting a press-down of the right hand button 34, and accepts an instruction as "left punch" when detecting a press-down of the left hand button 36.

For example, the instruction and reception process unit 113 accepts the instruction as "right kick" when detecting a press-down of the right kick button 37, and accepts an instruction as "left kick" when detecting a press-down of the left kick button 38.

The instruction and reception process unit 113 recognizes as a special instruction when inputting the player's input operation by a plurality of buttons simultaneously, or when inputting the player's input operation by a combination of an inclination angle the joystick 32 and each of the buttons.

For example, when detecting the operation of tilting the joystick 32 in the direction in which the player character moves forward in combination with the input of the buttons, the instruction and reception process unit 113 accepts the instruction of various attack actions of the player character.

For example, when detecting the operation of tilting the joystick 32 in the direction in which the player character moves backward in combination with the input of the buttons, the instruction and reception process unit 113 accepts the instruction of various defense actions of the player character.

The instruction and reception process unit 113 is designed to be able to accept the player's input operation for enhancing realism. For example, the instruction and reception process unit 113 accepts the instruction to allow the player character to perform a special motion after the player character moves left hand, right hand, left hand, right hand of the player character (in addition to the player character walks in the right direction), when detecting the pressing down of the buttons in the order of left hand button 36, right hand button 34, left hand button 36, right hand button 34 (in addition to detecting the tilting of joystick 32 in the right direction).

The instruction and reception process unit 113 accepts the player's input operation for continuous movement of the player character. For example, the instruction and reception process unit 113 accepts the instruction to allow the player character to perform a left kick after a jab with the left hand when detecting the pressing down of the right kick button 37 immediately, after pressing the left hand button 36.

The instruction and reception process unit 113 may receive the instruction commands recognized by the controller 160.

The game control unit 114 performs a process related to the progress of the multiplayer battle game. For example, the process related to the progress of the multiplayer battle game includes: the process of starting a game when the game start conditions are met (hereinafter also referred to as "game start process"); the game control process to control the progress of the multiplayer battle game by controlling the player character in response to the player's input operation; the game end process to terminate the game when the game end condition is met (hereinafter also referred to as "game end process"); and the process to control the progress of an ending part of the game when the final stage is completed.

The game control unit 114 performs the game control process of the replay target game (Hereinafter also referred to as a "replay target game instruction control process") in response to the player's input operation, when performing the replay process based on the game data for replay that has already been executed as the game and stored in the memory unit 170.

The replay data management unit 115 stores, to the memory unit 170, as game data for replay (hereinafter referred to as a "replay data") for each game: the data of the player's input operations (for example, instruction data) when performing the game control process to control the progress of the game by controlling the player character in response to the player's input operation; and various data executed by the game control process (hereinafter referred to as "game control data"); or both of these data.

The replay data management unit 115 provides the stored replay data to the replay process unit 116 when performing the replay process based on the replay data stored in the memory unit 170.

The replay data management unit 115 may store, in the memory unit 170, the instruction data, game control data of the retry data during the execution of the replay game in response to the reply target game.

The replay process unit 116 reads the replay data stored in the memory unit 170 via the replay data management unit 115. The replay process unit 116 performs the replay process to replay the contents of the game play in the replay target game from a given timing, such as the game start timing or the timing during the game indicated by the player, according to the read replay data.

The retry game setting unit 117 performs various settings for the game control process (for example, the replay target game instruction control process) from a given timing, as the retry game, based on the player's input operation with the game status of the replay target game being replayed.

The display control unit 118 controls the display of display objects displayed and output on the display unit 190.

Specifically, the display control unit 118 generates the display objects (game characters, backgrounds, targets, vehicles, balls, items, buildings, trees, pillars, walls, maps), indicates the display positions of display objects, disappearing the display objects, and performs other display control.

In other words, the display control unit 118 registers the generated display objects in the display object list, transfers the display object list to the drawing unit 120, deletes the disappeared display objects from the display object list, and performs other display controls.

The display control unit 118 performs animation process to move and operate the game characters such as player characters.

The animation process is a process to move the game characters (display objects defined by 2D or 3D data) in the game field (2D or 3D game space).

Specifically, the display control unit 118 performs animation process to move the display objects based on the input data, programs (movement algorithms) and various data, input by the player.

For example, the display control unit 118 sequentially calculates the movement information (position, rotation angle, speed, or acceleration) of the displayed object every frame (1/60 second).

The virtual camera control unit 119 performs a control process of a virtual camera (viewpoint) to generate an image seen from a given (arbitrary) viewpoint in the object space.

Specifically, in the case of generating a three-dimensional image, the virtual camera control unit 119 performs a process to control the position (X, Y, Z) and rotation angle (for example, a rotation angle in the case of clockwise rotation in terms of the positive direction of each of the X, Y and Z axes) of the virtual camera in the world coordinate system.

In other words, the virtual camera control unit 119 performs the process to control at least one of the viewpoint position, the viewing direction, the angle of view, the movement direction, and the movement speed of the virtual camera.

The drawing unit 120 performs a drawing process based on the results of various processes performed by the processor100, generates images by drawing process, and outputs the image to the display section 190.

In other words, the drawing unit 120 generates the images visible from the virtual camera in the object space.

For example, the drawing unit 120 receives object data (model data) including vertex data (vertex position coordinates, texture coordinates, color data, normal vector or alpha value, etc.) for each vertex of an object (model), and based on the vertex data included in the input object data, performs vertex processing (vertex shader processing). A vertex generation process (tessellation, surface division, polygon division) may be performed in order to re-divide polygons as necessary when the vertex processing is performed.

In vertex processing, the drawing unit 120 performs geometry processing, such as vertices movement process, coordinate transformation (for example, world coordinate transformation), field of view transformation (camera coordinate transformation), clipping process, fluoroscopy transformation (projection transformation), and viewport transformation, in accordance with the vertex processing program (vertex shader program or the first shader program).

The drawing unit 120 performs rasterization (scan conversion) based on the vertex data after the vertices processing and associates the plane of the polygon (primitive) with the pixel. The drawing unit 120 performs the pixel processing (shading by pixel shaders and fragment processing) for drawing the pixels (fragments constituting the display screen image) constituting the image after the rasterization.

In a pixel processing, the drawing unit 120 determines the final drawing color of the pixel constituting the image, by performing various processes such as reading the texture (texture mapping), setting/changing the color data, translucent compositing, and anti-aliasing in accordance with the pixel processing program (pixel shader program or the second shader program). The drawing unit 120 outputs (draws) the drawing color of the object converted into a fluoroscopy to the image buffer 176 (a buffer capable of storing image information in pixels. VRAM or rendering target).

In other words, in the pixel processing, the drawing unit 120 performs the per-pixel processing for setting or changing image information (color, normal line, brightness, and α value) in pixel units. Therefore, the drawing unit 120 generates the images visible from the virtual camera in the object space.

The vertices processing and the pixel processing are implemented by the hardware, the so-called programmable shaders (for example, the vertices shaders and the pixel shaders), that makes the polygon (primitive) drawing processing programmable by the shading program written in the shading language.

The programmable shader has high degrees of freedom of the content of the drawing process since the process at the vertices and the process at the pixels are programmable. Therefore, the expressiveness can be significantly improved compared to the fixed drawing processing using conventional hardware.

When drawing an object, the drawing unit 120 performs geometry processing, texture mapping, hidden surface erasing processing, and α blending.

The drawing unit 120 performs processes in the geometry processing, such as coordinate transformation, clipping processing, perspective projection conversion, light source calculation. The drawing unit 120 stores the object data (the position coordinate of the object's vertex, texture coordinate, color data (brightness data), normal line vector, or α value) after the geometry processing (after the perspective projection conversion) in the memory unit 170.

Texture mapping is a process for mapping a texture (a texture value) stored in the memory unit 170 to an object.

Specifically, the drawing unit 120 reads out the texture (a surface property such as color (RGB) and an α value) from the memory unit 170 using the texture coordinate set (provided) to the vertices of the object. The drawing unit 120 maps a texture that is a two-dimensional image to an object. In this case, the drawing unit 120 performs the process of matching pixels and tech cells, and bilinear interpolation as the interpolation of tech cells, and the like.

As the hidden surface removal process, the drawing unit 120 performs a hidden surface removal process according to Z-buffering (a depth comparison method, a Z test) using a Z-buffer (a depth buffer) in which a Z-value (depth information) of a drawing pixel is stored.

Namely, when drawing a drawing pixel corresponding to the primitive of an object, the drawing unit 120 refers to the Z value stored in the Z buffer. The drawing unit 120 compares the Z value of the referenced Z buffer with the Z value in the drawing pixel of the primitive. When the Z value in the drawing pixel is a Z value (for example, a smaller Z value) on the front side as viewed from the virtual camera, the drawing unit 120 performs drawing process of the drawing pixel and updates the Z value of the Z buffer to a new Z value.

The α blending (α compositing) refers to a translucent compositing process (straight α blending, additive α blending, or subtractive α blending) based on an α value (an A value).

For example, in α blending, the drawing unit 120 performs a linear compositing process based in the α value of a drawing color (a color to overwrite with) C1 to be drawn in the image buffer 176 and a drawing color (a basic color) C2 already drawn in the image buffer 176 (rendering target). In other words, when C denotes a final drawing color, the drawing unit 120 performs can obtain C according to $C=C1*\square+C2*(1-\alpha)$.

It should be noted that the α value is information that can be stored in association with each pixel (texel and dot) and is, for example, additional information other than color information. The α value can be used as mask information, translucent compositing process (equivalent to transparency and opacity), bump information, and the like.

In the case of a multi-player online game in which data is sent and received via a network with another terminal (a second terminal), the drawing unit 120 performs a process of generating an image from a virtual camera (a virtual camera controlled by the terminal (first terminal)) that follows the movement of the object of the operation target of the terminal (first terminal). In other words, each terminal performs independent drawing processing.

The sound controller 130 performs the sound process based on the results of various processes performed by the processor 100, generates a game sound, such as a BGM, an effect sound, or a voice, and outputs the image to the display section 192.

The terminal of the present embodiment may be controlled to allow game play in single player mode, in which only one player can play, or in multi-player mode, in which multiple players can play. For example, when controlling in multi-player mode, the game process may be performed by sending and receiving the data to and from other terminals via a network, or a single terminal may perform the processing based on input information from multiple inputs.

[3] Method of the Present Embodiment

[3.1] Overview

Figure 3:
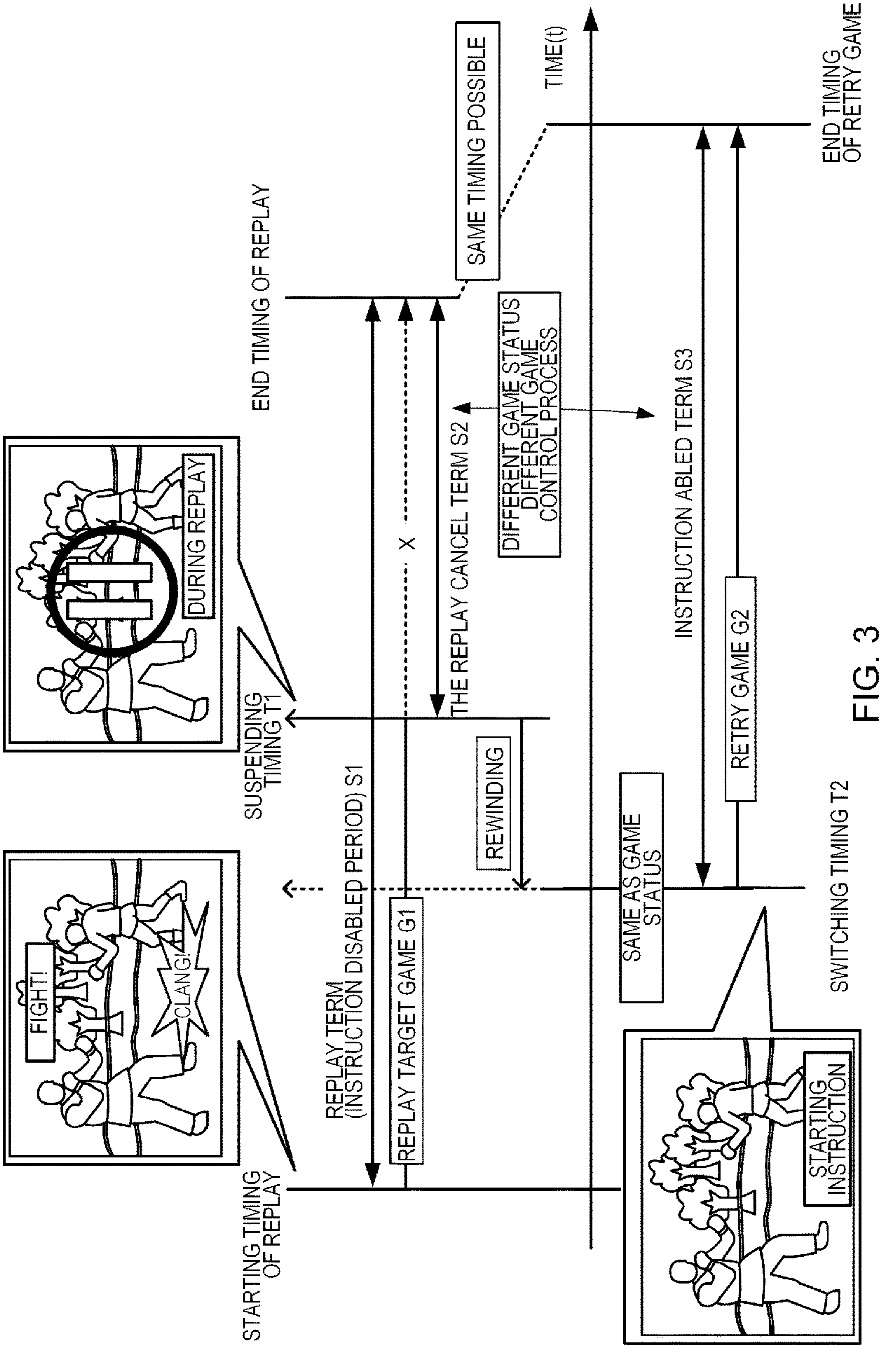
FIG. 3 is a diagram for explaining comparing a replay process in a replay target game and the replay target game instruction control process in a retry game in one embodiment of the present invention.

Next, the method and overview of the game control process for the replay target game (that is, the replay target game instruction control process) of this implementation will be described with reference to FIG. 3. FIG. 3 is a diagram for explaining comparing a replay process in a replay target game and the replay target game instruction control process in a retry game in the present embodiment.

The game system S of the present embodiment performs the multiplayer battle game in which the player character (which may be an avatar) is operated and controlled by the player. The game system S performs the game (that is, a retry game) based on the player's input operation after reflecting settings of the game status of the game to be replayed (that is, the replay target game), and accepting a new player's input operation, from a predetermined timing such as a timing when the player wishes to perform a re-operation (hereinafter also referred to as a "desired timing") during a replay of the multiplayer battle game that has already been performed in the past.

Namely, the game system S, is configured to be able to start performing the game control process based on the player's input operation from a predetermined timing during the performing the replay process of the multiplayer battle game in which a first character controlled by the operation of a first player and a second character controlled by the operation of a second player including a CPU play against each other in a given game space (object space).

Specifically, the game system S performs the reception process for receiving the player's input operation from the player, and a game control process for controlling the progress of the game by controlling the player character in response to the received player's input operation, and stores the data related to the game at the time the game control process is performed is stored in the memory unit 170 as the game data for replay.

As shown in FIG. 3, the game system S performs;

(A1) the replay process to read out the game data for replay stored in the memory unit in this manner, and to replay the game play from a given timing according to the read out game data;

(A2) the switching timing setting process to interrupt (that is, canceling) the replay process of the replay target game G1 when a given input operation is received from the player (interruption timing T1) during the replay term of the replay target game G1 subject to the replay process, and to set the switching timing T2 to start the game control processing for the replay target game G1, as the replay target game instruction control process, in response to the player's input operation;

(A3) the setting determination process to identify the game status of the replay target game G1 at the switching timing T2, and to determine given settings of the game when starting the replay target game instruction control process from the switching timing T2 based on identified the game status;

(A4) the replay target game instruction control process to perform the retry game G2 based on the settings determined by the settings determination process and the received player's input operation.

FIG. 3 is a timing chart showing the replay target game that has been replayed and a case in which the retry game is performed from the middle of the replay target game. Specifically, FIG. 3 is the timing chart that has: the start timing of replay in the replay target game G1 or retry game G2; the interruption timing T1 indicated by the player; the switching timing T2 set by the switching timing setting process; the end timing of replay and the end timing of the game indicating the end of the retry game; the replay term (instruction disabled period) S1; the replay cancel term S2 and the instruction enabled term S3 in time axis.

Also, FIG. 3 also shows that at the switching timing T2, for the same game, the game status of the replay target game is the same as the retry game, and that the replay cancel term S2 and the instruction enable term S3 are different game status and different game control processes (replay target game instruction control process).

Based on the above configuration, the game system S according to the present embodiment can replay the past game based on the player's instruction and the assumption of the game statuses of the past game, such as player's input operation history, the result details of the various objects of the player character and the like, the positions or the positional relationships of the various objects, and the various parameters, from not only the player's desired timing, but also from a separation timing before the player's desired timing. For example, the separation timing is a timing before the start of an attack or before the start of a scene or section thereof when the desired timing is during an attack.

Therefore, one embodiment of the present invention can easily replay of a past game from the timing desired by the player, or easily practice (including repeatedly practice) in a specific game scene, without complicated settings or instructions by the player.

[3.2] Game Data (Replay Data) and Replay Process

Next, the replay process including the game data (replay data) of the present embodiment will be described with reference to FIGS. 4A, 4B, 5A and 5B. FIGS. 4A, 4B, 5A and 5B show examples of the form of game data (replay data).

(Game Data and Replay Data)

The game data of the present embodiment is data related to the game when the game control process, which controls the progress of the game by controlling the player character in response to the player's input operation, is performed.

The game control process of the present embodiment includes not only the control process in which the game is progressed based on the operation control of the player character, but also control process in which another player characters are also controlled by the instructions of another player, such as the multiplayer game, and control processing in which another player character is controlled based on an automatic operations of NPC.

Therefore, the game data of the present embodiment is not only a data to control the player character, but also a data to control other player characters such as the NPC.

For example, as shown in FIGS. 4A and 4B, the game data is:

(A1) the data (hereinafter referred to as an "instruction data" of the player's input operations output from the controller 30 accepted by the instruction and reception process unit 113 (the input operations of each player when the game is played by the plurality of players in the multiplayer game);

(A2) the control data to define the position (coordinates in the game space, the same hereinafter), motion (specifically, the position of each part of the player character and its coordinates in the game space, the same hereinafter), the status (that is, the current status and remaining amount of physical strength and life energy, the current value and remaining amount of parameters used when performing techniques, whether or not the player character is invincible or in a power-up state, or whether or not certain actions are restricted, such as being blocked from attacking) of the player character (or the plurality of player characters when the plurality of players participates in the game; the same hereinafter) including NPCs;

(A3) control data to specify the position, the motion and the status of each character appearing in the game (including, for example, enemy player characters).

(A4) control data to specify the position, the motion and the status of each object constituting the game space, such as a stage on which a game such as a battle is played, a course on which a race is run, or an object space for RPGs; and (A5) the combination of two or more of (A1)-(A4)

Although the game data is preferably the data group of time-series data from the start of the game to the end of the game, the game data may indicates the data group of time-series data of any one interval during the game.

Further, the game data may be game data of a retry game performed by a replay target game instruction control process, or game data of a game played by another player.

FIG. 4A shows an example of the instruction data (the cross key directions and combinations of the right hand button, the left hand button, the right foot button and the left foot button) of player A and player B from the start of the game (0 seconds) as the game data.

FIG. 4B shows an example of the control data of the position coordinates, the motion and the status of the player characters of player A and player B from the start of the game (0 seconds) as the game data.

The replay data is the game data stored in memory unit 170 for replay, and as shown in FIGS. 5A and 5B, the game data that has the various types of information, such as identification information about the game (game ID), identification information about the player (player ID), and information about the date and time when the game was performed.

FIG. 5A shows an example of the instruction data (the cross key directions and combinations of the right hand button, the left hand button, the right foot button and the left foot button) of player A having the player ID "101" and player B of the CPU player from the start of the game (0 seconds) as the game data that is performed in Sep. 10, 2020 using game ID "001."

FIG. 5B shows an example of the control data of the position coordinates, the motion and the status of the player characters of player A and player B of the CPU player from the start of the game (0 seconds) as the game data that is performed in Sep. 14, 2020 using game ID "001."

(Replay Process)

The replay process unit 116 reads the various game data as described above stored in the memory unit 170, and performs the replay process to replay the play contents of the replay target game from the given timing such as the timing at which the game has started (hereinafter referred to as the "game start timing"), in accordance with the read game data.

In other words, the replay process unit 116 is configured to simply perform the process of reproducing the past game contents based on the game data like the animation (video), and the process to view by the player without player's operation input of a player in real time.

Specifically, the replay process unit 116 displays the play contents of the replay target game on the display 40 (display 190) by animation, and allow the player to view the play contents of the game.

Specifically, when using the player's instruction data as game data, the replay process unit 116 controls the game control unit 114, performs the game control process based on the game data, works in conjunction with the display control section 118, virtual camera control unit 119 and drawing unit 120, and displays the result of the process on the display unit 40 as an animation.

When the control data is used as game data, the replay process unit 116 controls each character including the player character and each object, in accordance with such control data, and displays the results of the control of the player character and other objects on the display unit 40 as an animation.

When both of the player's instruction data and the control data are used as game data, the replay process unit 116 performs the game control process to control the player character based on the instruction data regarding important parts of the game, such as battle scenes. Further, the replay process unit 116 controls the motion of the player character and other characters or objects according to the control data, integrates the motion and changes of each character or object including the controlled player character, and displays as an animation on the display unit 40.

The replay process unit 116 may perform the replay process from a given timing, such as the game start timing, a specific timing in the game progression including a timing when the game level, the character level of the player character, or the stage in the game changes, or a timing indicated by the player.

[3.3] Switching Timing Setting Process

Figure 6:
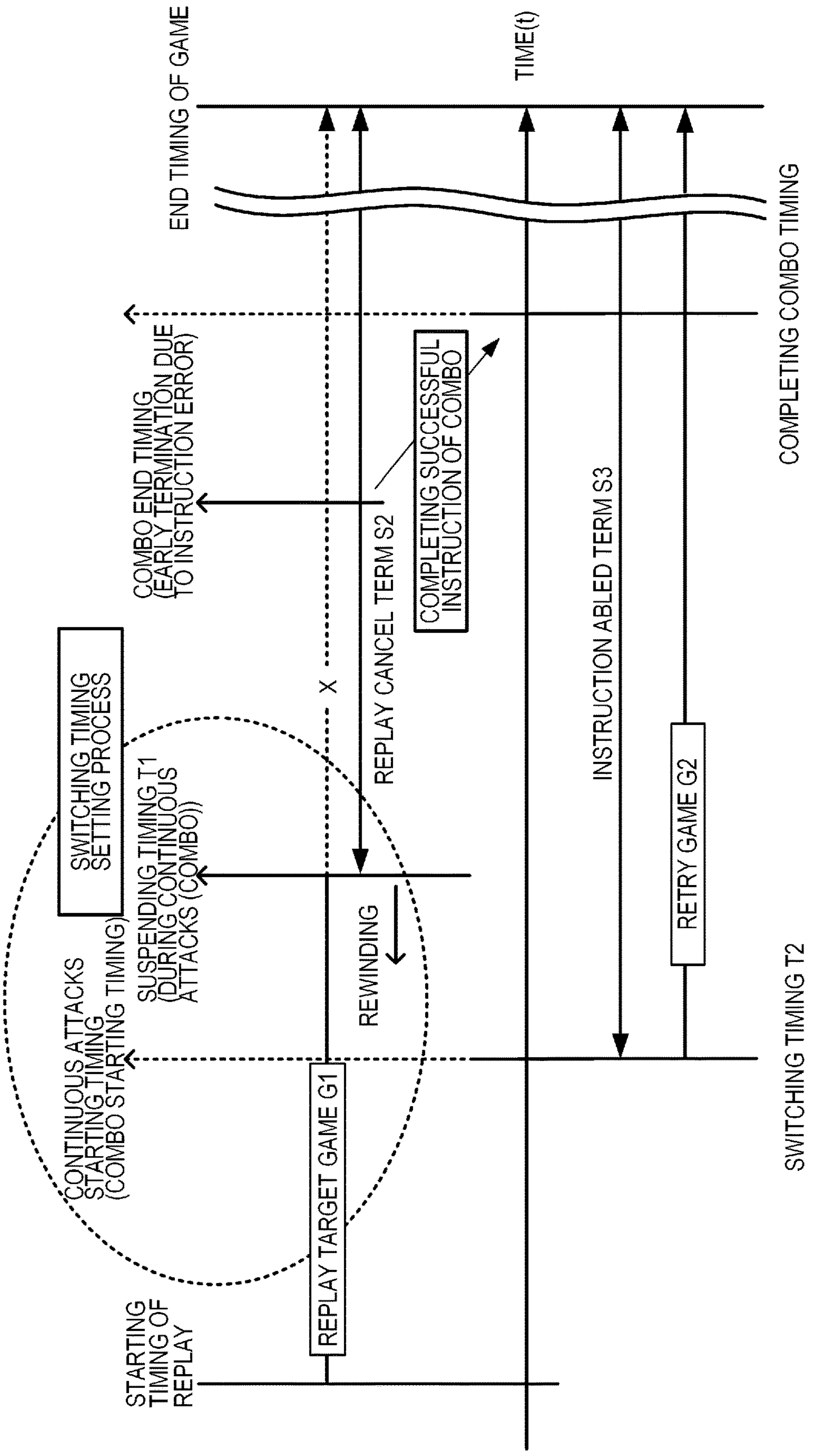
FIG. 6 is a diagram for explaining a basic principle of a switchover timing setting process in one embodiment of the present invention.
Figure 7:
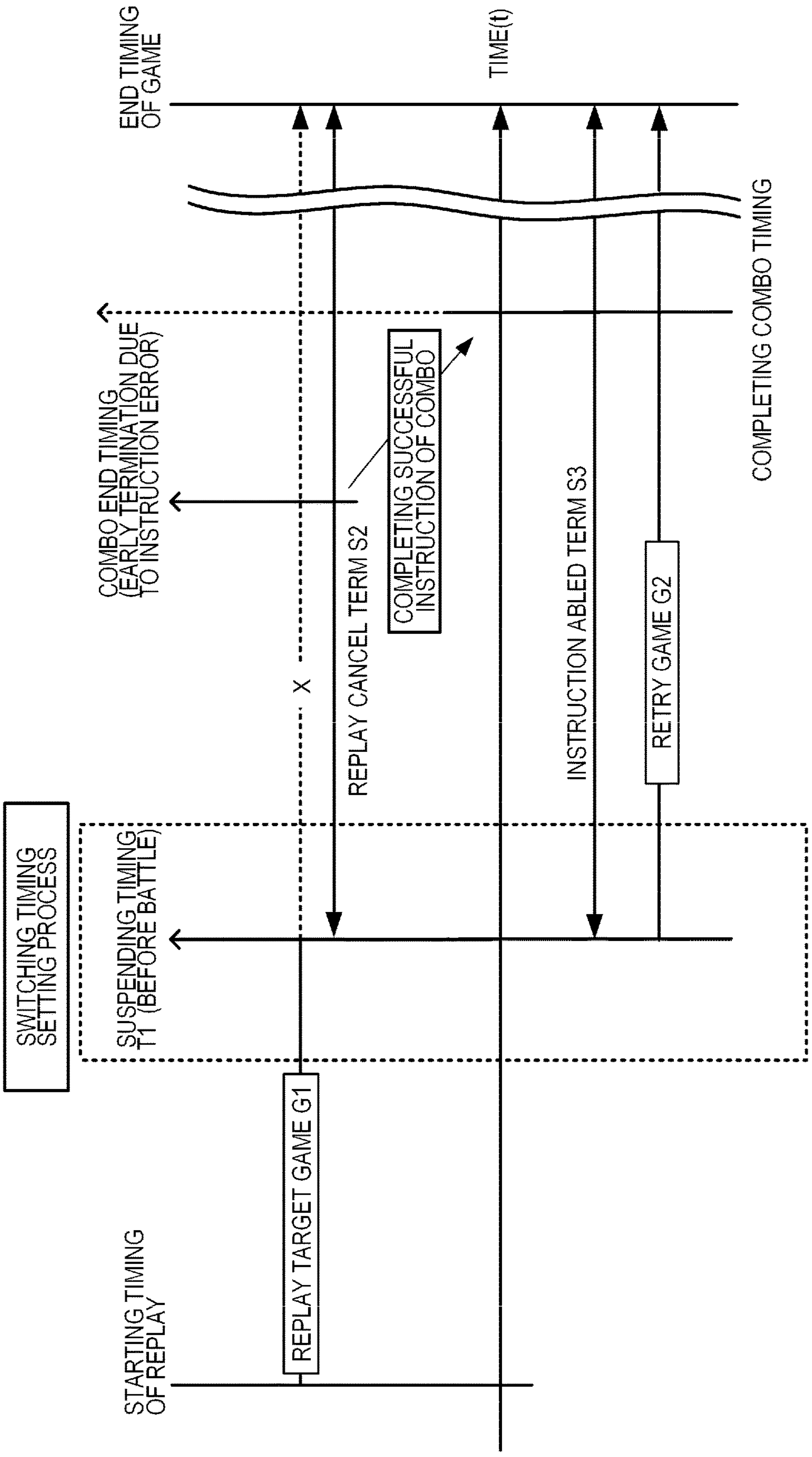
FIG. 7 is a diagram for explaining a basic principle of a switchover timing setting process in one embodiment of the present invention.
Figure 8:
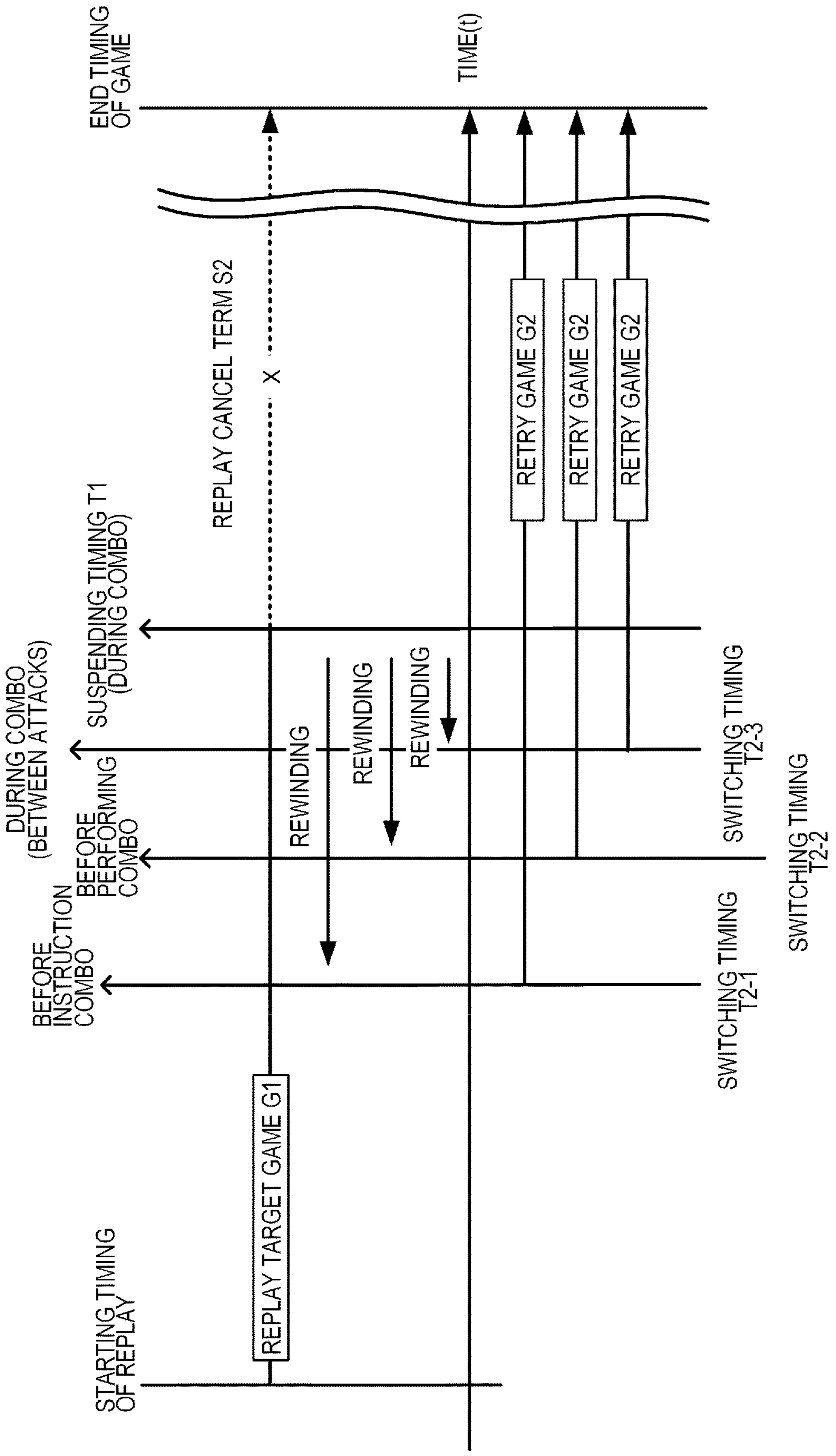
FIG. 8 is a diagram for explaining an application of a switchover timing setting process in one embodiment of the present invention.
Figure 9:
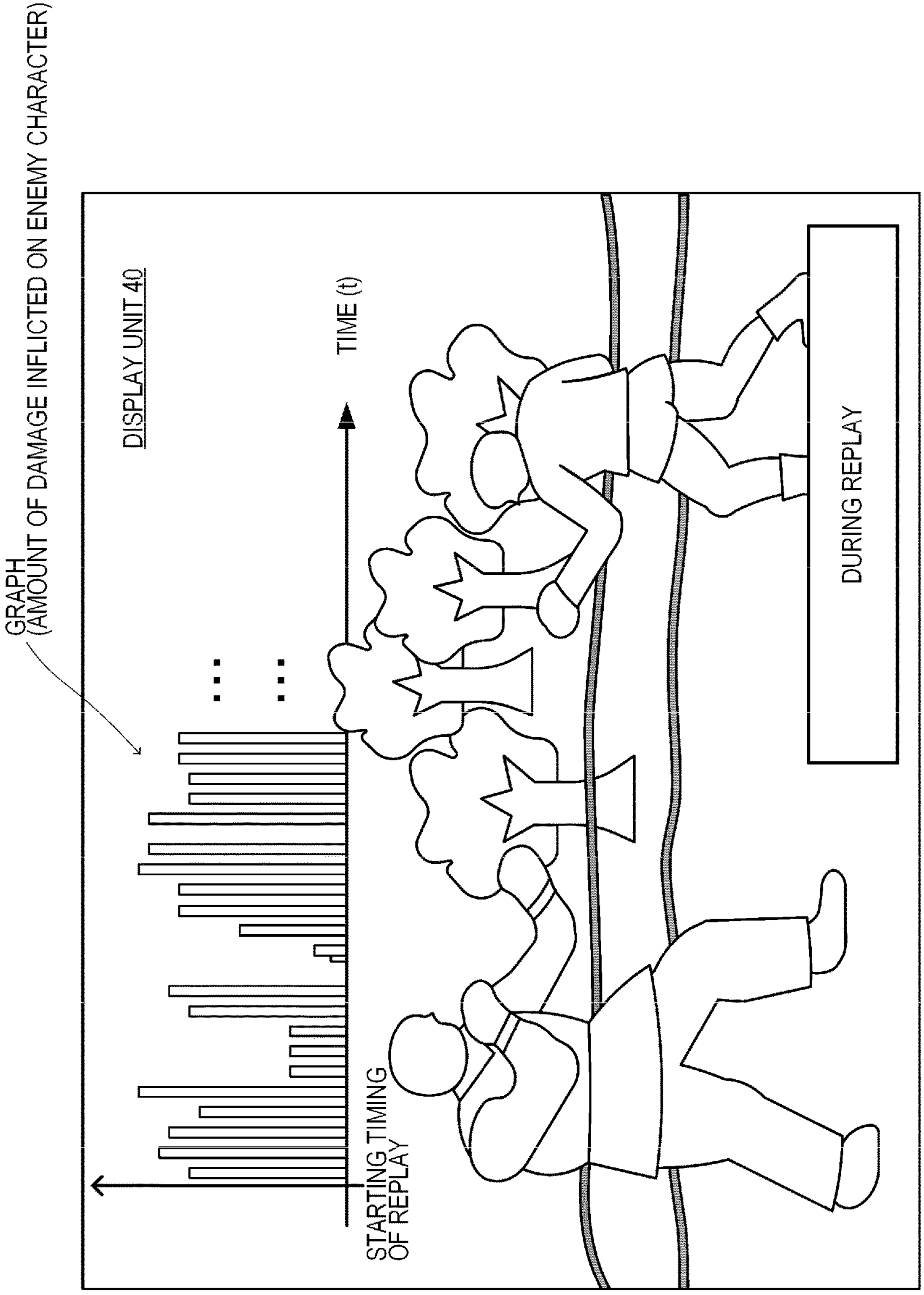
FIG. 9 is a diagram for explaining an application of a switchover timing setting process in one embodiment of the present invention.
Figure 10:
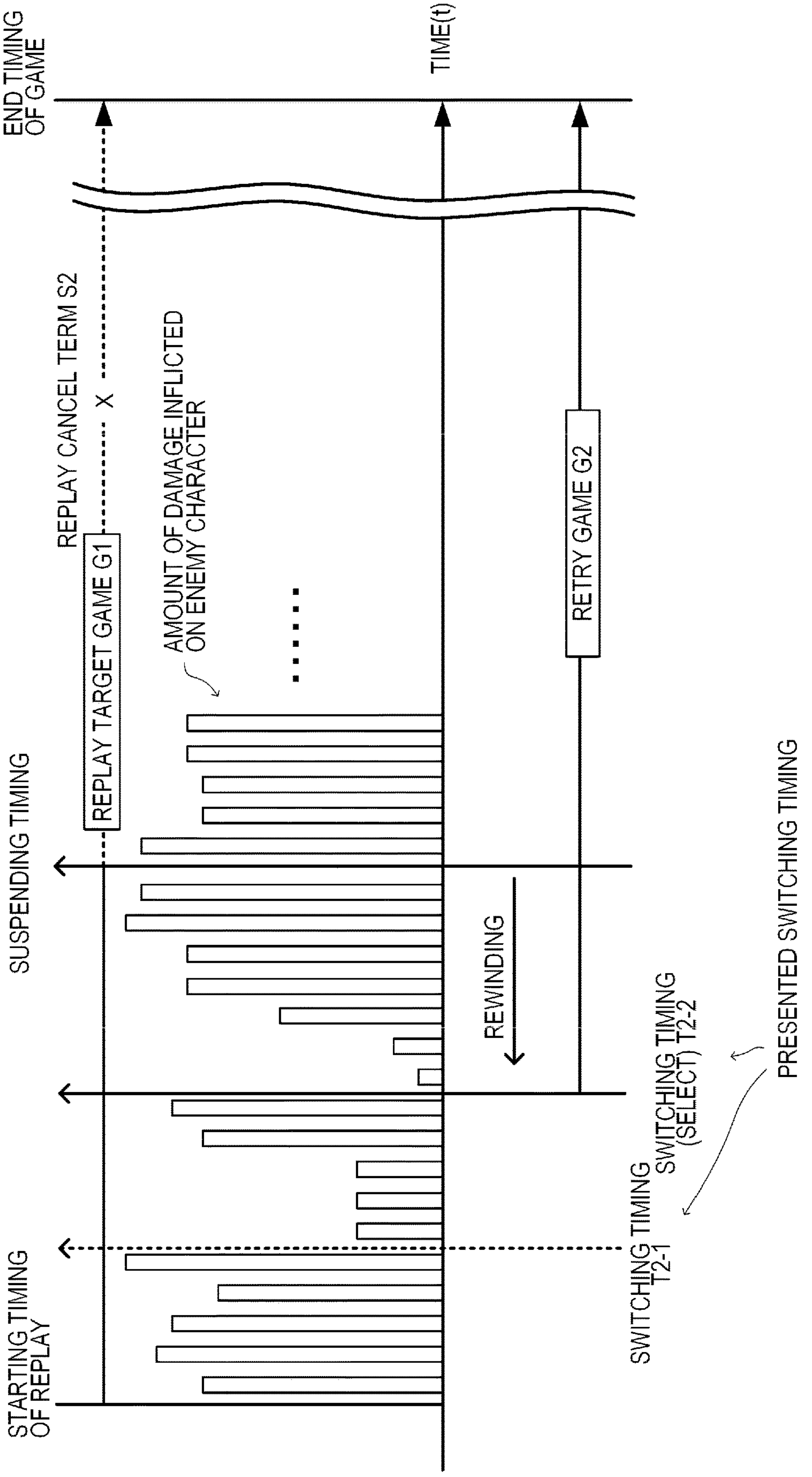
FIG. 10 is a diagram for explaining an application of a switchover timing setting process in one embodiment of the present invention.

Next, the switching timing setting process of the present embodiment will be described with reference to FIGS. 6 to 10. FIGS. 6 and 7 are diagrams for explaining a basic principle of the switchover timing setting process in the present embodiment. FIGS. 8 to 10 are diagrams for explaining an application of the switchover timing setting process in one embodiment of the present invention.

(Basic Principle of Switching Timing Setting Process)

The retry game setting unit 117 performs the switching timing setting process to:

(A1) interrupt the replay process when a given input operation from the player is received during the replay of the replay target game; and (A2) set the timing at which starting the replay target game instruction control process for the replay target game (that is, switching the game control process of the replay target game) in response to the player's input operation, as the switching timing.

Specifically, as shown in FIG. 6, the retry game setting unit 117 preferably performs the switching timing setting process to set the switching timing that is a timing (that is, the rewound timing) that comes before the interruption timing in which the replay process is interrupted.

Further, as shown in FIG. 7, the retry game setting unit 117 may perform the switching timing setting process to set the switching timing that is the interruption timing.

Furthermore, the retry game setting unit 117 may set a timing specified by the player in advance, a uniformly determined timing before the interruption timing, or a timing predetermined in the game, as the switching timing.

The retry game setting unit 117 may set, as the switching timing: a timing at which the motion of the player character cannot be changed after the interruption timing; a timing during another event; and a timing (a timing before an event) earlier than the shown these timings when a timing at which an event caused by the motion of the player character at the interruption timing occurs.

FIG. 6 shows an example of a case in which the switching timing is set to a timing prior to the start of a series of attacks when the interruption timing is during continuous attacks (so-called "combo" timing), which is inappropriate as the switching timing.

Also, FIG. 6 shows an example that in the retry game G2, the combo is completed due to a successful operation, while, in the replay target game G1, the game is over early by terminating the combo based on an operation error during the combo (during continuous attacks).

FIG. 7 shows an example of a case in which the switching timing is the interruption timing when the interruption timing is a timing prior to the start of the battle, and is an appropriate timing as the switching timing.

Also, similar to FIG. 6, FIG. 7 shows an example that in the retry game G2, the combo is completed due to a successful operation, while, in the replay target game G1, the game is over early by terminating the combo based on an operation error during the combo (during continuous attacks).

Application Example 1 of the Switching Timing Setting Process

As shown in FIG. 8, the retry game setting unit 117 may set a timing selected by the player from among a plurality of timings, to the switching timing.

Specifically, when the interruption timing is during an event, based on the player's input operations, the retry game setting unit 117 may present a plurality of timings detected in the replay target game during the replay process, such as a first timing before the instruction of the specific command, a second timing before the start of performing of the specific command, and a third timing that is the specified timing during the event caused by the specific command. Further, the retry game setting unit 117 may set the timing selected by the player to the switching timing.

For example, in this case, the retry game setting unit 117, in conjunction with the display control unit 118 and the drawing unit 120, may display a plurality of the detected options on the display unit 40, or may display each of the plurality of the detected options on the display unit 40 as an image (for example, thumbnail, and chronologically frame-by-frame display), in order to present the plurality of timing to the player.

FIG. 8 shows an example of a case in which the first switching timing (before combo operation) T2-1 is selected by the player from among first switching timing T2-1, the second switching timing (before the start of combo execution) T2-2, and the third switching timing (between attacks during combo) T2-3.

Application Example 2 of the Switching Timing Setting Process

For example, as shown in FIG. 9, the retry game setting unit 117 may visualize the variation of a given game element by a graph from the beginning of the game to the end of the game in the replay target game during the replay process, in order to allow the player to select an interruption timing. Further, the retry game setting unit 117 may display the visualized variation of the game element on the display unit 40.

The retry game setting unit 117 may set the time of the specified area as the interruption timing when a player specifies a part of area (including points) the game element that is graphed in the graph displayed along the time axis.

In other words, as shown in FIG. 9, the retry game setting unit 117 is configured to visualize the temporal or distance changes of game elements and the ratio of game elements from the start to the end of the game by using the game elements, using the parameters indicating game elements such as the amount of damage inflicted on an enemy character or the amount of damage received from the enemy character as game elements, along the time axis or along the axis of distance in the game space.

Therefore, in the present embodiment the player can consider factors (scenes directly related to the loss) that caused the player character to lose due to changes in game elements, and can intensively practice the retry game regarding the reason for the defeat when the beginning of the scene of the cause of the defeat is set as the switching timing.

Specifically, the retry game setting unit 117 may visualize the variation of a given game element along the time axis by the pie chart, the bar graph, the line graph, the band graph, the radar chart, the scatter diagram or the like, and may display the visualized variation of the game elements on the display unit 40. Regarding the graph that does not have the time axis such as the pie chart, the retry game setting unit 117 may generate the graph for each predetermined term. Further, the retry game setting unit 117 may allow the player to visualize the various in the game elements from the start to the end of the game, by the various in the graph for each predetermined term.

As shown in FIG. 10, the retry game setting unit 117 may automatically detect the switching timing, or set the switching timing by the player's input operation, when the interruption timing is set.

FIG. 9 shows a visualization of the variation in the amount of damage inflicted on the enemy character at predetermined time intervals as a graph at the top of the display unit 40. FIG. 10 shows an example of a case in which the player selects switching timing T2-2 from among the two switching timings when the timing when the amount of damage inflicted on the enemy character is below a certain value is automatically detected as a candidate switching timing.

For example, the above game element includes:

(B1) damage dealt by the player character to the enemy character and damage received by the player character;

(B2) elements directly related to game over and progress of the game, such as the hit point, life energy value, and points of the player character;

(B3) attack elements such as a number of techniques used when attacking, a number of attacks, and a number of hits in attacks;

(B4) defense elements such as a number of defenses and a number of attacks received during defense;

(B5) a number of owned items and a number of uses of the items;

(B6) elements related to movement such as a number of accelerations, a number of decelerations, average speed, and speed change (B7) elements related to combos and mistakes, such as a number of continuous attacks, and a number of consecutive task clears and mistakes in games, for example, sound games, that clear consecutive tasks.

[3.4] Setting Decision Process

Next, the setting determination process of the present embodiment will be described.

When the switching timing is determined, the retry game setting unit 117 performs the setting determination process: to identify the game status of the replay target game at the switching timing; and to determine the given settings in the game when the replay game instruction control process is started from the switching timing based on the identified game status.

In other words, the retry game setting unit 117 determines the various settings for starting (switching) the replay target game as the retry game, with the game status of the replay target game during replaying, as the setting determination process.

Specifically, the retry game setting unit 117 determines, as the given settings in the game when starting the replay target game instruction control process from the switching timing, the first settings to faithfully reproduce the identified game status, or the second settings with some settings changed that do not faithfully reproduce some game status of the first settings.

Specifically, the retry game setting unit 117 determines, as the settings, the parameters that indicate the identified game status when faithfully reproducing the identified game status.

Further, when faithfully reproducing the identified game status by change some game statuses, the retry game setting unit 117 determines the settings other than predetermined settings such as hit point and time limit, or the settings having additional settings that includes a player's level and a number of items.

For example, the retry game setting unit 117 identify, as the game status:

(A1) a parameter (for example, color information, a coordinate of the target to be reached in the case of a moving object, and final form in the case of an object undergoing change) that is set for each of characters including a player character such as a position (a coordinate in the game space), motion (specifically, each of current coordinates of parts of the character and a coordinate of final position of them after moving), a hit point (for example, a current point and a maximum point), an experience point and an ability score (including unlocked score after satisfying the predetermined condition) of each of characters in game, same as below);

(A2) a parameter related to an item including a type of an item, a number of items, and ability score of the item obtained by each of the characters and the player such as color information, a coordinate of the target to be reached in the case of a moving object, and final form in the case of an object undergoing change;

(A3) a parameter such as acquired in-game currency, scores, points, and results; and (A4) a parameter related to an object in the game space, such as a type, a position, and characteristics of each of an object.

The retry game setting unit 117 determines, as the settings, the game elements (including the parameters) of these and updates the settings of the retry target game based on the determined game elements.

The retry game setting unit 117, in conjunction with the display control unit 118 and the drawing unit 120, may present the identified game status or the determined settings to the player by displaying on the display unit 40.

The retry game setting unit 117 may perform the retry game with the settings that are not faithfully reproduced, in order to perform the game from a new perspective from the switching timing by settings that is different from the original game to progress the game.

In this case, the retry game setting unit 117 performs the setting change process to determine the settings of at least some of the above game elements based on the player's input operations, before switching to the retry game.

For example, the settings of the settings change process includes:

(B1) the position in the game space of each character including the player character and the enemy characters;

(B2) a type of each of the characters;

(B3) a type of and a number of the items in the player character;

(B4) a change to the game stages and quests; and (B5) occurrence or cancellation of the event in the game space, such as the presence or absence of the explosion and the change in the game stage (for example, the floor breaks during battle).

The retry game setting unit 117 may perform the process, as the settings change process, to change the settings that have set already during the replay target game instruction control process of the replay target game after starting the retry game.

The retry game setting unit 117 may be configured to determine the settings for identifying the game status based on the player's input operation during the retry game, in order to perform the game from the new perspective on the original game by progressing the game based on the setting different from the settings of the original game.

The settings in such a case include these settings similar to the setting change process before switching the retry game.

[3.5] Replay Target Game Instruction Control Process

Figure 11:
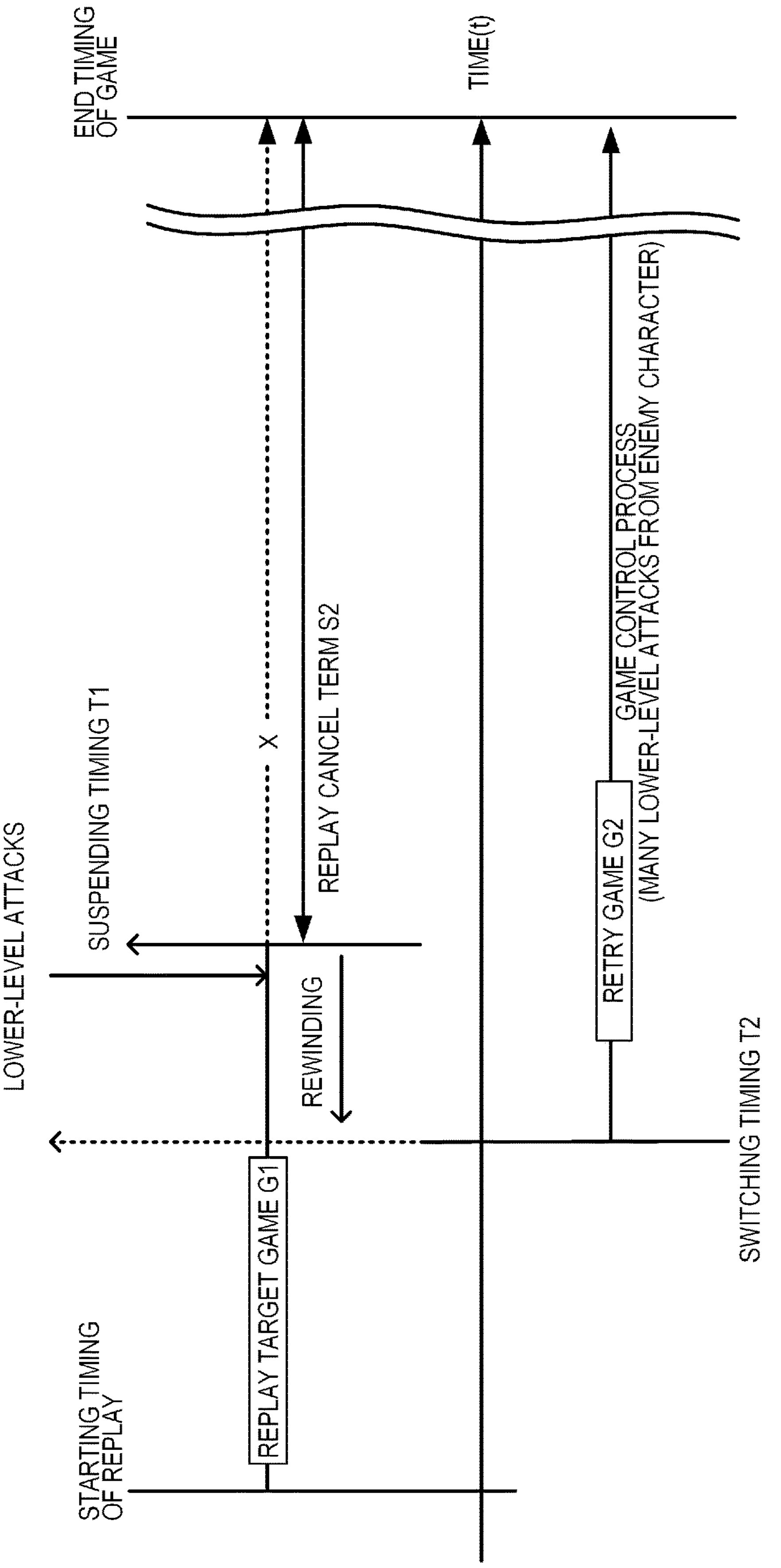
FIG. 11 is a diagram for explaining a replay target game instruction control process in one embodiment of the present invention.

Next, the reply target game instruction control process of the present embodiment will be described with reference to FIGS. 3 and 11. FIG. 11 is a diagram for explaining the replay target game instruction control process of the present invention.

(Base Principle of Replay Target Game Instruction Control Process)

As described above, based on the settings determined by the settings determination process and the received player's input operation, the game control unit 114 performs the replay target game instruction control process for the replay target game as a retry game from the switching timing.

In other words, the game control unit 114 starts the retry game based on the same game status as the replay target game at the switching timing, and performs the replay target game instruction control process for the retry game based on the received player's input operation For example, the game control unit 114 controls the general control of the game as the replay target game instruction control process not only the player character to be operated by the player, but also control of the motion of another character and control of each of the object in the game space.

Specifically, the game control unit 114 performs the replay target game instruction control process to control the motion of the opponent character to be the opponent of the player character, as the retry game, based on the game status of the retry target game at the switching, when performing the multiplayer game in which the player character battles another character.

As described above, because the game statuses at the switching timing is the same as the replay target game, the game control unit 114 can start the game by taking over the replay target game with respect to the game content at the switching timing, as shown in FIG. 3.

On the other hand, when receiving the player's input operation different from the case where the replay target data is replayed, the game control unit 114 performs the game control process (that is, the replay target game control process) of the retry game different from the original game, as shown in FIG. 3.

Therefore, in the present embodiment, the past game from the timing desired by the player can be easily replayed, and t a specific game scene can be easily practiced (or repeatedly practiced) without complicated settings or instructions by the player.

In the present embodiment, when performing the replay target game instruction control process, the game control unit 114 may change the speed of progress of the game (including a part of term in the game).

In other words, in the retry game, the game control unit 114 may control to perform the replay target game by speed set based on the player's input operation, the predetermined speed (for example, 0.5× speed) and speed slower than the progress speed when the replay process or the game control process is performed. The execution of the game may be controlled.

(When Changing the Control Contents from the Original Game)

When performing the replay target game instruction control process from the switching timing, the game control unit 114 may perform, as a retry game, the game control process different from the game control process before the switching timing of the replay target game.

Namely, the game control unit 114 may change the control contents of the game control process before the switching timing, based on the player's input operation or the attribute of the player's level and so on.

Specifically, in this case, the game control unit 114 changes the control contents after the switching timing from the control contents before the switching timing. For example, the control contents are:

(A1) a type, an ability, an item or the like of the character and an object that appear in the game;

(A2) the operation timing and motion such as an appearance timing, an appearance method, an attack timing, an attack method of various characters including enemy characters;

(A3) the control timing of the object; and (A4) the game environment including background music and an insert image.

For example, as shown in FIG. 11, in the multiplayer battle game, when a lower-level attack from an enemy character is detected immediately before the interruption timing T1, the game control unit 114 performs, as the retry game, the game control process in which lower-level attacks from the enemy character are performed more than usual, when performing the replay target game instruction control process from the switching timing (after rewinding).

[3.6] Other Example

Next, the other example of the present embodiment will be described with reference to FIGS. 12 to 15.

Figure 12:
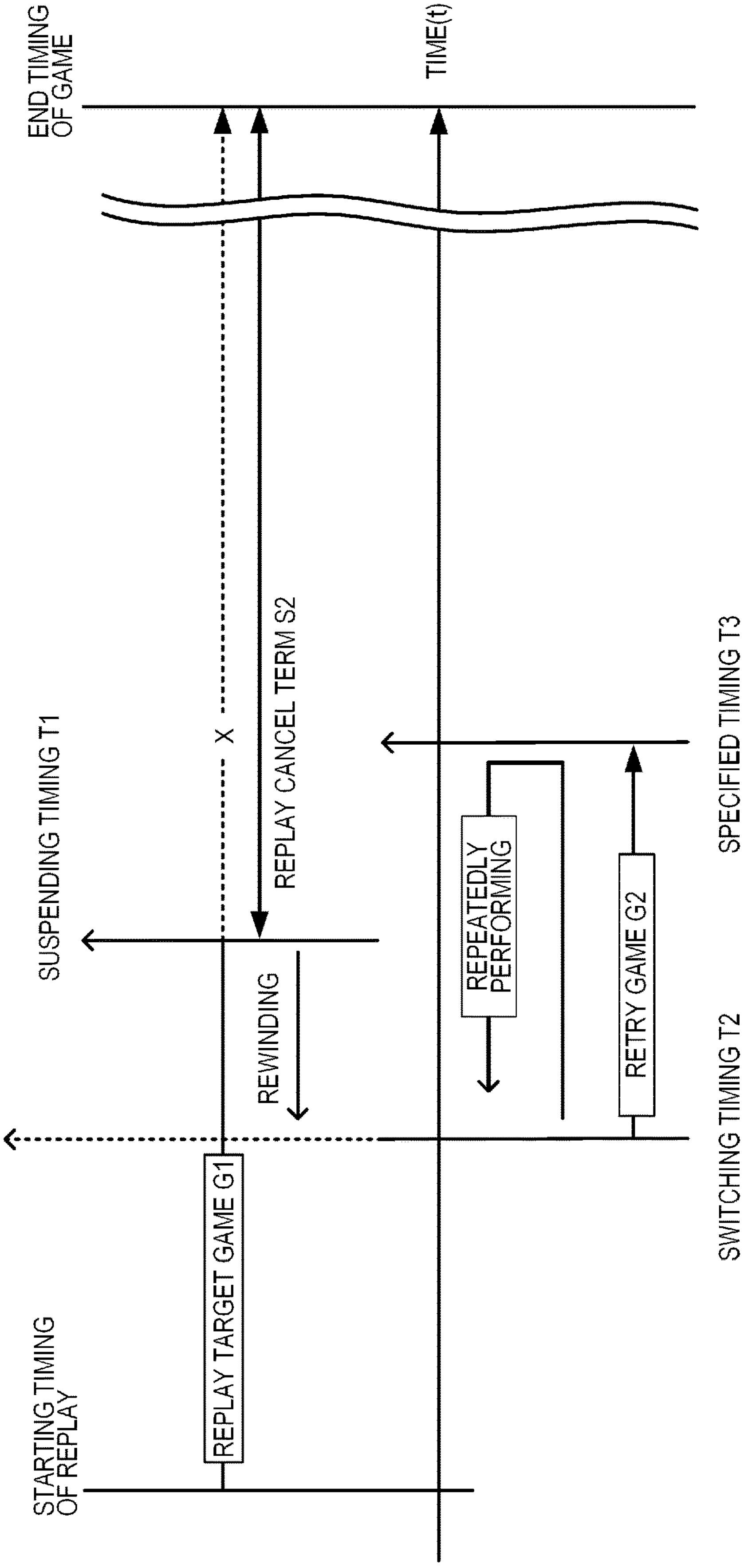
FIG. 12 is a diagram for explaining a repetition practice mode that repeatedly executes a game for a term from the switchover timing to a predetermined timing in one embodiment of the present invention.
Figure 13:
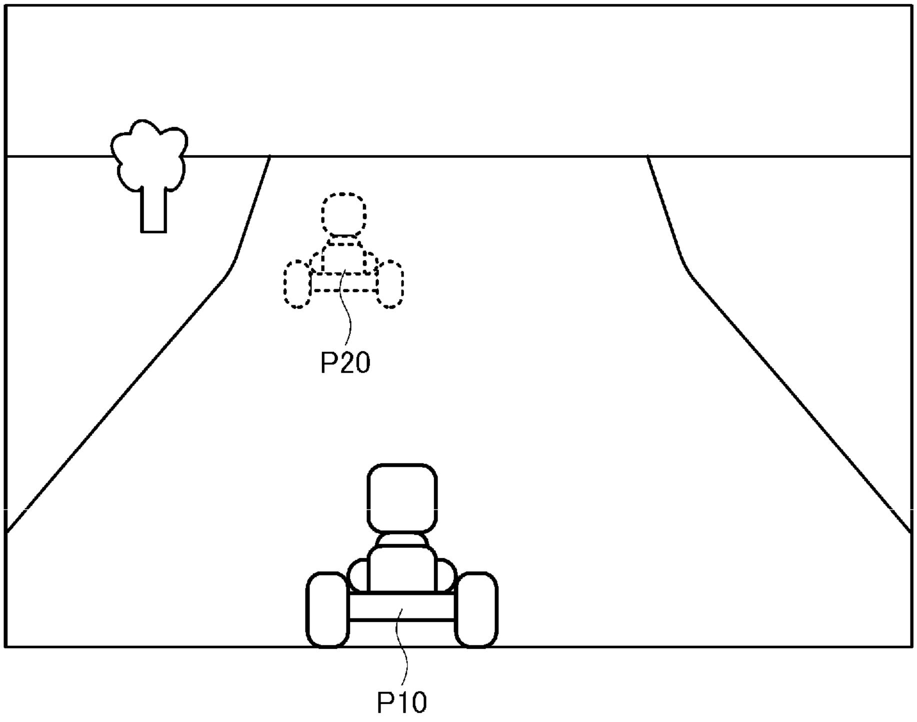
FIG. 13 is a diagram for explaining a ghost display in one embodiment of the present invention.

FIG. 12 is a diagram for explaining the repetition practice mode that repeatedly executes the game for a term from the switchover timing to a predetermined timing in the present invention. FIG. 13 is a diagram for explaining the ghost display of the present invention.

Figure 14:
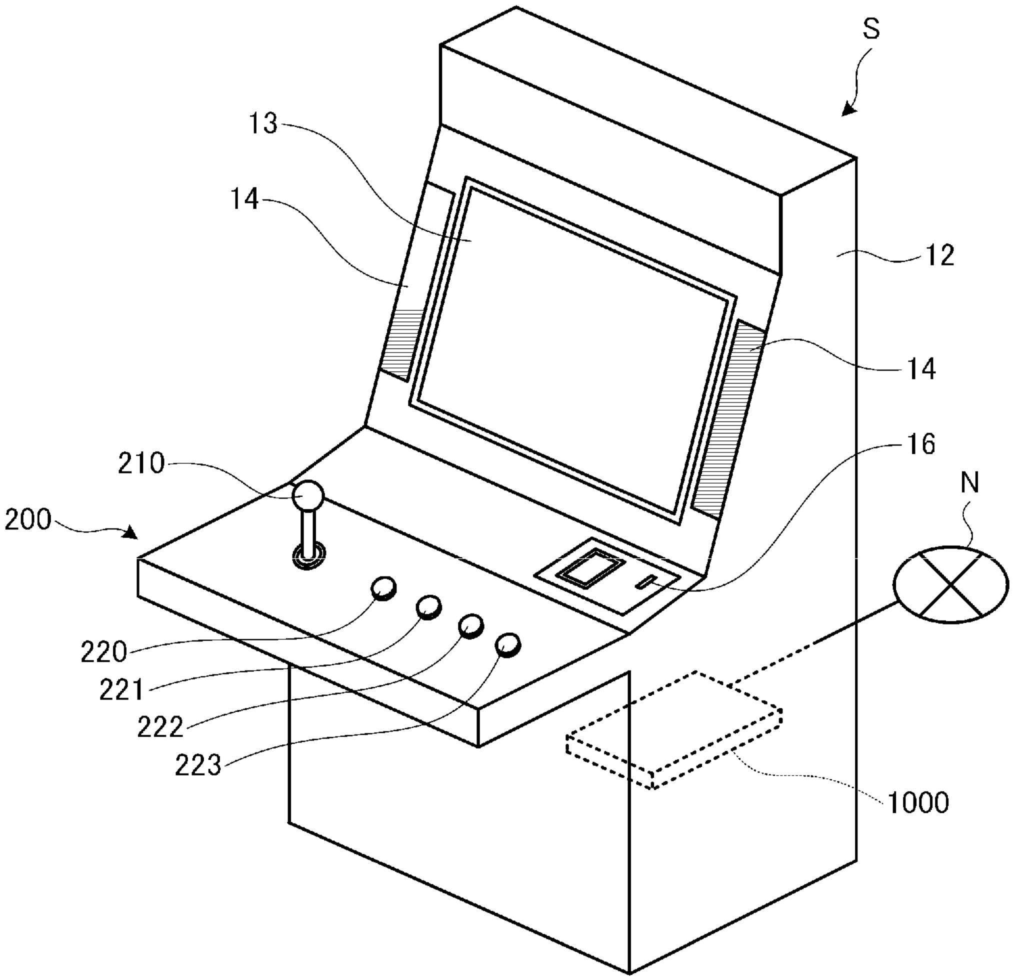
FIG. 14 is an outside drawing illustrating an example of an arcade game system based on the game system according to one embodiment of the present invention.
Figure 15:
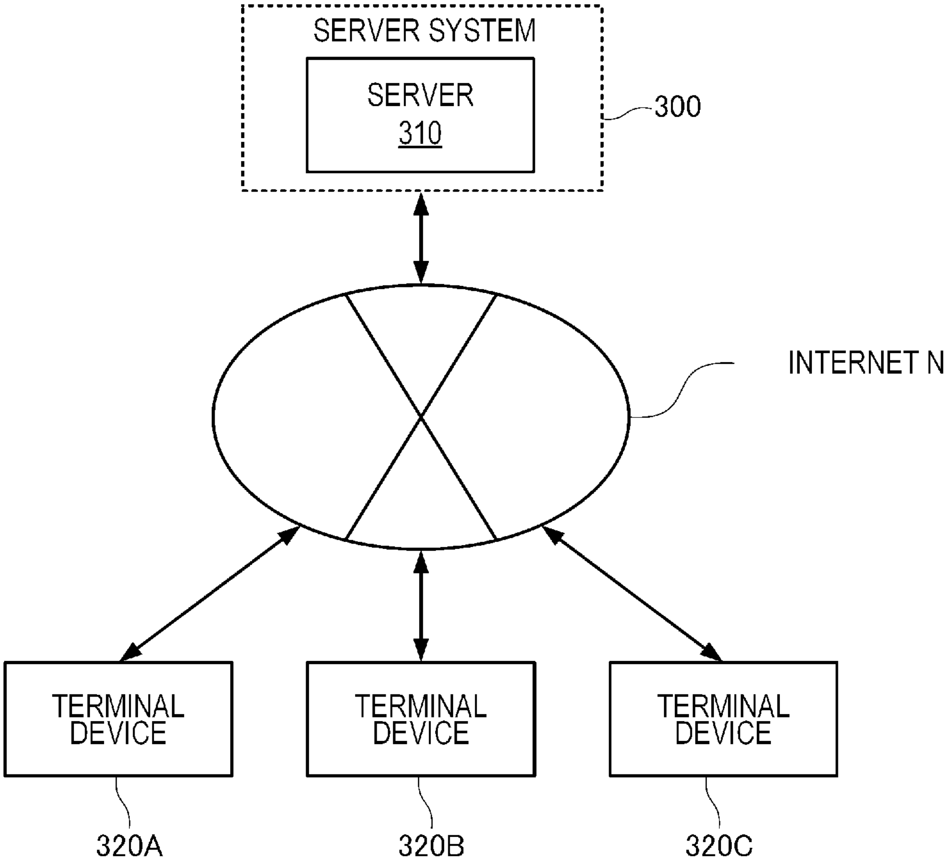
FIG. 15 is a system configuration diagram illustrating an example of a server system with a network based on the game system according to one embodiment of the present invention.

FIG. 14 is the outside drawing illustrating an example of an arcade game system based on the game system according to the present embodiment. FIG. 15 is a system configuration diagram illustrating an example of the server system with a network based on the game system according to the present embodiment.

(Repeat Practice Mode)

The game system S of the present embodiment performs, in the retry game, the replay target game instruction control process by repeating the term from the switching timing to a predetermined specific timing (hereinafter referred to as "specific timing").

In other words, the game system S has the configuration capable of repeatedly performing the replay target game of a predetermined section or a predetermined term in a racing game, a shooting game, or the like, and intensively practicing the section or term in which the player is weak.

Specifically, in this case, as shown in FIG. 12, the retry game setting unit 117 sets, in the switching timing setting process, when receiving the instruction to perform the repeat practice mode by the player as a given input operation, the switching timing T2 and the T2 and a specific timing T3, which indicates a specific timing after T2.

Specifically, the retry game setting unit 117 sets, as the specified timing: a timing specified by player's input operation, a timing after a predetermined period of time, such as 30 seconds after the switching timing, or a timing determined by a time division such as a time limit or the time division set in the game.

For example, in the present embodiment, the division set in the game is a division up to the first stage that ends after the switching timing when the game has multiple stages, and a division up to a predetermined point on the path taken by the player character in the game (that is, a specific section).

As shown in FIG. 12, the game control unit 114 repeatedly performs, as the retry game, the replay target game instruction control process in a predetermined term from the switching timing T2 to the specified timing T3 during performing the repeat practice mode.

In other words, at the specified timing, the game control unit 114:

(A1) cancels performing the retry game, (A2) resets the game settings at the switching timing determined by the setting content determination process, and (A3) starts again the replay target game instruction control process based on the reset settings.

The game control unit 114 may perform the replay target game instruction control process by moving the switching timing automatically every time the specified timing comes. Further, the game control unit 114 may perform the replay target game instruction control process by moving the switching timing after the player's input operation, such as the instruction of the repeat practice mode, or after a predetermined term, such as 10 second.

(Comparison Result Display)

The game system S of the present embodiment may compare the results of the retry game and the original game and present them to the player.

In other words, based on the comparing the results of the retry game and the original game, the game system S of the present embodiment has the configuration capable of presenting the operation skills (operation skills accompanying improvement in performance, etc.) in the retry game by visualizing, and recognizing the player's degree of improvement and progress.

Specifically, the replay data management unit 115 specifies each of the results of the game (final results such as game results, or results at predetermined timing such as results at predetermined intervals such as lap times or intermediate results) by performing the game control process, and stores each of the results of the game with the game data for replay in the stores unit 170.

For example, the replay data management unit 115 identifies:

(B1) the results of the battle, such as the winning percentage, a number of wins, a number of losses, a number of kills in the battle game;

(B2) hit points such as or a number of attacks made, and the number of enemy character such as a number of the defeated enemy characters shot down;

(B3) the point;

(B4) a time to complete a mission or task, or time from start to goal or predetermined point; or (B5) earned rewards such as items, points or in-game currency, and stores the final results or the results at a predetermined timing.

The game control unit 114 performs a comparing process to read out, during the retry game or at a predetermined timing such as the timing after the end of the retry game, the results of the original game, which is the replay target game replayed by the game data for which the replay target instruction control process has not performed yet, and to compare the read out results of the original game and the result of the retry game that is the same replay target game as the original game.

The display control unit 118, in conjunction with the drawing unit 120, provides the results of the comparing process to the player by an image information or the like.

For example, in the multiplayer battle game, the game control unit 114 reads out the physical strength values of the enemy character and the player character, the amount of the damage inflicted on the enemy character, or the amount of damage received from the enemy character in the game subject to replay during replay.

The game control unit 114 performs the comparing process to compare value reads out, the hit point of the enemy character and the player character of the retry game when has already finished, the amount of the damage inflicted on the enemy character, or the amount of damage received from the enemy character.

The game control unit 114 performs the comparing process during the progress of the retry game, the fluctuation statuses of each value.

(Display of Ghost Character)

As shown in FIG. 13, the game system S in the present embodiment appears, in the retry game during the performing of the replay target game instruction control process, at least the player character of the original game, which is the same replay target game and in which the replay target game is the same as the retry game.

In other words, the game system S in the present embodiment has the configuration: of easily visually recognize a difference from an original game during performing the retry game; and as a result; of useful practice in the retry game.

FIG. 13 shows an example of a case in which the player character (that is, a ghost character) P20 at the time of the replay process in a race game is ghostly displayed on the display 40 together with the player character P10, which is being performed as the retry data and is subject to the player operation.

(Arcade Game System)

In addition to being applicable to a home-use game system, the game system S in the present embodiment can be implemented, for example, by an arcade game system set up in the store (amusement park), as shown in FIG. 14.

For example, as shown in FIG. 14, such a game system S has: a body 12 that has a processor (computer) that performs game process, etc.; a display 13 that shows a game screen; a speaker 14 that outputs sound effects and background music; a game operation unit 200; and a coin-insertion unit that is used for game play fees.

The game system S has the system board 1000 that has the CPU, image generation IC, sound generation IC and the like. The game system S is configured to perform the battle game based on the game program and game data read from a memory, which is an information storage medium, and an instruction signal input from the controller 32 and buttons.

The game operation unit 200 has the same function as the controller 30 described above, and thus has a lever 210 and buttons 220, 221, 222 and 223.

For example, the right hand button 220 is an input unit for "right punch," the left hand button 221 is an input unit for "left punch," the right foot button 222 is an input unit for "right kick," and the left foot button 223 is an input unit for "left kick".

(Network Play for Battle Game)

The game system S of the above embodiment has a plurality of controllers 30, and a battle game is played by having each controller 30 operated by each player. However, by connecting a plurality of the game systems S via a network, it is possible to control the player characters for each of the game system S, and to perform each of the above process of each of the game system S including the game control process by working together with each of the process, with each of the above configurations.

(Server System)

In the above embodiment, as shown in FIG. 15, a server system 300 may has one server 310 to provide the above game to one or more terminal devices 320 via a network N. Alternatively, the server system 300 may has a plurality of servers 310 may work together to provide the game to one or more terminal devices 320.

Specifically, the server system 300 works as the above game system while connecting the plurality of terminal devices 320 to the server system 300 via a network N by wired communication or wireless communication.

The server system 300 may serve as the game system by providing the game data of replay process (including only image data) and the game data of the control process (including only image data) to the relevant terminal device 320, while accepting the player's input operation.

In other words, the server system 300 is configured to perform:

(C1) accepting the player's input operation to the terminal device 320;

(C2) the game control process to control the progress of the game by controlling the player character in accordance with the accepted input operation;

(C3) storing, as the game data for replay, the game data when performing the game control process, to the memory unit;

(C4) the replay process to read out the stored game data for replay and to replay the game play from a given timing according to the read-out game data;

(C5) interrupting the replay process of the replay target game when a given input operation is accepted from the player during the replay of the replay target game subject to the replay process, and setting the switching timing for starting the game control process of the replay target game in response to the player's input operation as the replay target game instruction control process;

(C6) the determination process to identify the game statuses of the replay target game at the switching timing, and to determine the setting of the game when starting the replay target game instruction control process from the switching timing based on the identified game statuses; and (C7) providing the information on the progress of the game, including the replayed information, to the terminal device 320.

In this case, the server system 300 is configured to perform the replay target game instruction control process from the switching timing, as the retry game, based on the setting determined by the determination process and the accepted player's input operation.

Although the game system of the present invention is applied to the server system 300 that runs in conjunction with the terminal device 320 through the network, the game system of the present invention may also be applied to the tablet-type information terminal device and the personal computers.

[4] Operation of Present Embodiment

Next, the operations of the replay process including the retry game that is performed by the game system S of the present embodiment will be described with reference to FIG. 16.

Figure 16:
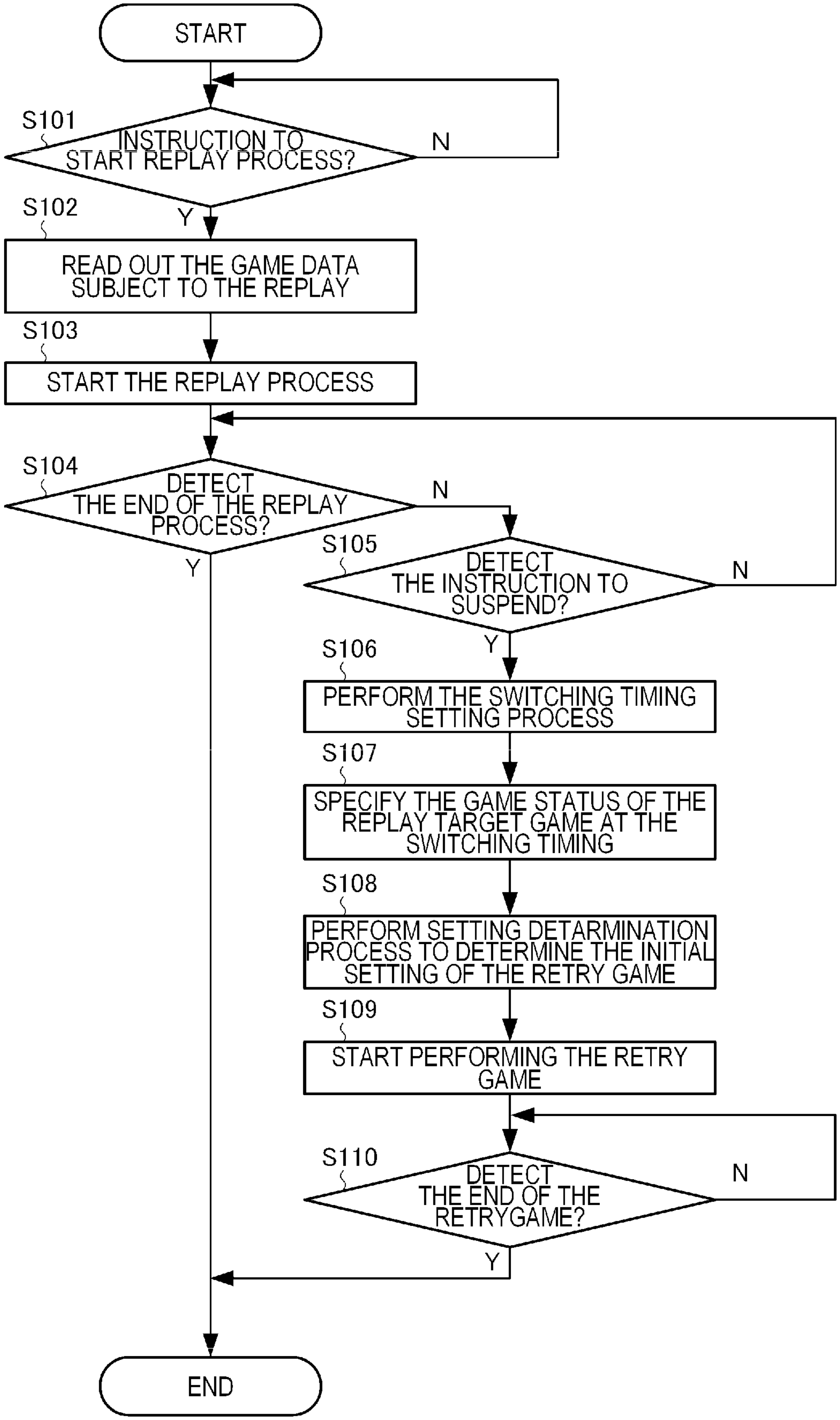
FIG. 16 is a flowchart illustrating a replay process including a retry game that is performed by a game system of one embodiment of the present invention.

FIG. 16 is a flowchart illustrating the replay process including the retry game performed by the game system according to the present embodiment.

In the present operation of this operation, the game data of the replay target game subject to a target of the replay process is already stored in the memory unit 170.

First, the replay process unit 116 receives an instruction transmitted from the controller 30, which is an instruction to perform the replay process in the player, and a game ID of the replay target game subject to the replay process (step S101). Further, the replay data management unit 115 reads out the game data of the game ID subject to the replay target game (Step S102).

Next, the replay process unit 116 starts the replay process based on the read-out game data.

Once the replay process is started, the replay process unit 116 performs the replay process of the read-out game data (instruction data and game control data) in chronological order and, in conjunction with the display control unit 118 and the drawing unit 120, displays the contents of the game play on the display 40.

Next, the replay process unit 116 determines whether or not it has detected an indication of the end of the replay process by the player or the end of the game based on the read-out game data (step S104).

When determining to detect the indication of the end of the replay process by the player or the end of the game based on the read-out game data, the replay process unit 116 terminates this operation, otherwise the replay process unit 16 moves to the process of step S105.

Next, the replay process unit 116 determines whether or not it has detected an indication to suspend the replay process in the player (step S105).

When determining to detect the indication to suspend the replay process in the player, the replay process unit 116 moves to the process of step S106. When determining not to detect the indication to the replay process in the player, the replay process unit 116 moves to the process of step S104.

Next, the replay process unit 116 performs the switching timing setting process to set the start timing of the retry game, that is, the switching timing in the replay target game (step S106).

Next, the replay process unit 117 identifies the game status (the instruction data and the game control data) of the replay target game at the switching timing based on the read-out game data (Step S107).

Next, the retry game setting unit 117 performs the setting determination process to determine the settings for starting the retry game from the switching timing (that is, the content of the initial settings of the so-called retry data) based on the identified game status (Step S108).

Next, the game control unit 114 starts accepting the player's input operation and starts performs the game control process (that is, the replay target game instruction control process) based on the determined setting (step S109).

Once starting performing the replay target game instruction control process, the game control unit 114 performs the game control process based on the accepted player's input operation and the determined settings until the game end instruction is input.

Finally, when detecting the game end such as victory or defeat of the player character (step S110), the game control unit 114 terminates the retry game and ends this operation.

[5] Other

The present embodiment is not limited to those described in the above-described embodiments, and various modifications and variations can be made. For example, words cited as broadly or synonymously in the description or drawings may be replaced by broadly or synonymously in the description or drawings.

In embodiments, the game is not limited to a multiplayer battle game. For example, it can be used in the game with the player's input, such as race games, music games, puzzle games, shooting games, role-playing games (RPGs) or simulation games.

The present embodiment includes substantially the same configuration as the configuration described in the embodiment (for example, configuration with the same function, method and result, or configuration with the same purpose and effect). The present embodiment also includes a configuration in which non-essential parts of the configuration described in the embodiment are replaced. The present embodiment also includes a configuration that achieves the same effects as the configuration described in the embodiment or a configuration that can achieve the same purpose. The embodiment also includes a configuration obtained by adding a known technique to the configuration described in the above embodiment.

Although the present embodiments have been described in detail as described above, it will be readily apparent to those skilled in the art that many variations are possible without departing materially from the new matter and effect of the present invention. Accordingly, all such modifications are intended to be within the scope of the present invention.

REFERENCE SIGNS LIST

S: Game system
1: Server
10: Game main unit
12: Body
13: Display unit
14: Speaker
16: Coin insertion unit
30: Controller
40: Display unit

100: Processor
110: Communication control unit
111: Object space setting unit
112: Movement and motion control unit
113: Instruction and reception process unit
114: Game control unit
115: Replay data management unit
116: Replay process unit
117: Retry game setting unit
118: Display control unit
119: Virtual camera control unit
120: Drawing unit
130: Sound processor
160: Controller
162: Card-read/write unit
170: Memory unit
172: Main memory unit
176: Image buffer
180: Information storage medium
190: Display
192: Sound output unit
196: Communication unit
200: Game operation unit
260: Input unit
300: Server system
310: Server
320: Terminal device
1000: System board

What is claimed is:

1. A game system that plays a game using a player character that is controlled by player's instruction, comprising one or more processors and one or more memories, the processor programmed to:

accept a player's input operation;

perform a game control process that controls progress of the game by controlling the player character in accordance with an accepted input operation;

store to a memory unit, as game data for replay, data of the game when performing the game control process;

perform a replay process to read out stored game data for replay from the memory unit, and to replay game play from a given timing according to read-out game data;

interrupt the replay process of a replay target game when accepting a given input operation from the player during the replay of the replay target game subject to the replay process, and set a switching timing for starting the game control process of the replay target game in response to the player's input operation as a replay target game instruction control process;

perform a determination process to identify a game status of the replay target game at the switching timing, and to determine a given setting of the game when starting the replay target game instruction control process from the switching timing based on the identified game status; and perform the replay target game instruction control process from the switching timing as a retry game based on settings determined by the determination process and the player's input operation accepted after the switching timing.

2. The game system according to claim 1, wherein the processor is programmed to perform the game control process different from the game control process before the switching timing of the replay target game, as the retry game, when performing the replay target game instruction control process from the switching timing.

3. The game system according to claim 1, wherein the processor is programmed to perform the replay target game instruction control process to control the motion of an opponent character to be the opponent of the player character, as the retry game, based on the game status of the retry target game at the switching, when performing game control process and the replay target game instruction control process of a multiplayer game in which the player character battles another character.

4. The game system according to claim 1, wherein the processor is programmed to perform the interrupting process to set, as the switching timing, a timing before an interruption timing when interrupting the replay process.

5. The game system according to claim 1, wherein the processor is programmed to set the switching timing and a specific timing indicating a timing after accepting switching timing when accepting a given input operation from the player, and perform the replay target game instruction control process by repeating a term from the switching timing to the specific timing as the retry game.

6. The game system according to claim 1, wherein the processor programmed to:

specify the results of each game performed by the game control process and the results of the retry game performed by the replay target game instruction control process;

perform a comparing process to compare the results of an original game, which is the replay target game replayed by the game data for which the replay target game instruction control process has not been performed, with the results of the retry game in the same replay target game as the original game; and provide a comparison result of the comparing process to the player.

7. The game system according to claim 1, wherein the processor programmed to perform the game control process to appear, in the retry game during the performing of the replay target game instruction control process, at least the player character of the original game, which is the same replay target game as the retry game.

8. The game system according to claim 1, wherein the processor programmed to visualize a change of a given game element from the start of the replay target game to the end of the replay target game, and to prove the change to the player, and perform the determination process to identify the status of the replay target game at an instructed switching timing when instructing the switching timing based on the game element provided by the player, and to determine the given setting on the game when starting the replay target game instruction control process.

9. The game system according to claim 1, wherein the processor programmed to perform a setting change process to determine the setting subject to the determination process at switching timing based on the player's input operation, and to change the setting that has determined already during the replay target game instruction control process.

10. A method of performing a game using a player character that is controlled by player's instruction, comprising:

accepting a player's input operation;

performing a game control process that controls progress of the game by controlling the player character in accordance with an accepted input operation;

storing to a memory unit, as game data for replay, data of the game when performing the game control process;

performing a replay process to read out stored game data for replay from the memory unit, and to replay game play from a given timing according to read-out game data;

interrupting the replay process of a replay target game when accepting a given input operation from the player during the replay of the replay target game subject to the replay process, and setting a switching timing for starting the game control process of the replay target game in response to the player's input operation as a replay target game instruction control process;

performing a determination process to identify a game status of the replay target game at the switching timing, and to determine a given setting of the game when starting the replay target game instruction control process from the switching timing based on the identified game status; and performing the replay target game instruction control process from the switching timing as a retry game based on settings determined by the determination process and the player's input operation accepted after the switching timing.

11. A server system that provides information of a game using a player character that is controlled by player's instruction to a terminal device, comprising one or more processors and one or more memories, the processor programmed to:

accept a player's input operation;

perform a game control process that controls progress of the game by controlling the player character in accordance with an accepted input operation;

store to a memory unit, as game data for replay, data of the game when performing the game control process;

perform a replay process to read out stored game data for replay from the memory unit, and to replay game play from a given timing according to read-out game data;

interrupt the replay process of a replay target game when accepting a given input operation from the player during the replay of the replay target game subject to the replay process, and set a switching timing for starting the game control process of the replay target game in response to the player's input operation as a replay target game instruction control process;

perform a determination process to identify a game status of the replay target game at the switching timing, and to determine a given setting of the game when starting the replay target game instruction control process from the switching timing based on the identified game status;

provide information of game progress that includes replayed information to the terminal device; and perform the replay target game instruction control process from the switching timing as a retry game based on settings determined by the determination process and the player's input operation accepted after the switching timing.

12. A method of providing, to a terminal device, information of a game using a player character that is controlled by player's instruction, comprising:

accepting a player's input operation;

performing a game control process that controls progress of the game by controlling the player character in accordance with an accepted input operation;

storing to a memory unit, as game data for replay, data of the game when performing the game control process;

performing a replay process to read out stored game data for replay from the memory unit, and to replay game play from a given timing according to read-out game data;

interrupting the replay process of a replay target game when accepting a given input operation from the player during the replay of the replay target game subject to the replay process, and setting a switching timing for starting the game control process of the replay target game in response to the player's input operation as a replay target game instruction control process;

performing a determination process to identify a game status of the replay target game at the switching timing, and to determine a given setting of the game when starting the replay target game instruction control process from the switching timing based on the identified game status;

providing information of game progress that includes replayed information to the terminal device; and performing the replay target game instruction control process from the switching timing as a retry game based on settings determined by the determination process and the player's input operation accepted after the switching timing.

* * * * *